US008589930B2

(12) United States Patent
Abe

(10) Patent No.: US 8,589,930 B2
(45) Date of Patent: Nov. 19, 2013

(54) DETERMINING WHETHER TO EXECUTE A NEW TASK BY DELETING TASK OBJECTS OF EXISTING TASKS

(75) Inventor: Mutsumi Abe, Katsushika-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 2106 days.

(21) Appl. No.: 10/504,189

(22) PCT Filed: Mar. 17, 2003

(86) PCT No.: PCT/JP03/03172
§ 371 (c)(1),
(2), (4) Date: Aug. 11, 2004

(87) PCT Pub. No.: WO03/081429
PCT Pub. Date: Oct. 2, 2003

(65) Prior Publication Data
US 2005/0149927 A1 Jul. 7, 2005

(30) Foreign Application Priority Data

Mar. 22, 2002 (JP) ................................ 2002-080549
Mar. 22, 2002 (JP) ................................ 2002-080799

(51) Int. Cl.
*G06F 9/46* (2006.01)
(52) U.S. Cl.
USPC ........................................................ 718/102
(58) Field of Classification Search
USPC ................................................. 718/104, 106
See application file for complete search history.

(56) References Cited

U.S. PATENT DOCUMENTS

| 4,318,173 A | 3/1982 | Freedman et al. |
| 4,807,228 A | 2/1989 | Dahbura et al. |
| 5,357,512 A | 10/1994 | Khaira et al. |
| 5,437,032 A | 7/1995 | Wolf et al. |

(Continued)

FOREIGN PATENT DOCUMENTS

| JP | A 62-284437 | 12/1987 |
| JP | A-2-139630 | 5/1990 |

(Continued)

OTHER PUBLICATIONS

Liu et al., "Algorithms for Scheduling Imprecise Computations", May 1991, IEEE, vol. 24 Issue 5, pp. 58-68.*

(Continued)

*Primary Examiner* — Meng An
*Assistant Examiner* — Eric C Wai
(74) *Attorney, Agent, or Firm* — Oliff & Berridge, PLC

(57) ABSTRACT

It is possible to simultaneously obtain a task delay guarantee and an effective task execution. Each of tasks (A1, A2, A3) is divided into a guaranteed portion and a controllable portion. The controllable portion is handled as a portion which can be deleted. While virtually changing the processing level of the reserved tasks (A1, A2) between the case not containing any controllable portion and the case containing a controllable portion, it is judged whether a task (A3) newly requested for reservation can be executed and at the processing level when the execution is judged to be possible, tasks (A1, A2, A3) to be executed are selected. By adjusting the quality of the reserved tasks (A1, A2), it is possible to accept and execute the task (A3) newly requested for reservation. Thus, it is possible to simultaneously obtain the task delay guarantee and the effective task execution.

28 Claims, 14 Drawing Sheets

(56) References Cited

U.S. PATENT DOCUMENTS

| | | | |
|---|---|---|---|
| 5,727,210 | A | 3/1998 | Dwork et al. |
| 5,794,036 | A | 8/1998 | Gomi et al. |
| 5,919,266 | A | 7/1999 | Sud et al. |
| 6,052,707 | A * | 4/2000 | D'Souza ............... 718/106 |
| 6,061,709 | A | 5/2000 | Bronte |
| 6,304,866 | B1 * | 10/2001 | Chow et al. ............... 1/1 |
| 6,385,638 | B1 | 5/2002 | Baker-Harvey |
| 6,658,595 | B1 | 12/2003 | Thamattoor |
| 6,961,934 | B2 | 11/2005 | Alford et al. |
| 7,284,224 | B2 | 10/2007 | Wang et al. |
| 2002/0152256 | A1 | 10/2002 | Wetzel et al. |
| 2003/0046324 | A1 | 3/2003 | Suzuki et al. |
| 2004/0064829 | A1 | 4/2004 | Pallister et al. |
| 2004/0181707 | A1 | 9/2004 | Fujibayashi |

FOREIGN PATENT DOCUMENTS

| | | |
|---|---|---|
| JP | A-5-307478 | 11/1993 |
| JP | A 7-38510 | 2/1995 |
| JP | A 7-262025 | 10/1995 |
| JP | A-8-202409 | 8/1996 |
| JP | A-8-212064 | 8/1996 |
| JP | A 10-171667 | 6/1998 |
| JP | A 10-171668 | 6/1998 |
| JP | A 10-240548 | 9/1998 |
| JP | A 10-243004 | 9/1998 |
| JP | A 11-237995 | 8/1999 |
| JP | A 11-259311 | 9/1999 |
| JP | A 2000-56989 | 2/2000 |
| JP | A 2001-43094 | 2/2001 |
| JP | A 2001-515242 | 9/2001 |
| WO | WO 99/12097 | 3/1999 |
| WO | WO 00/62157 | 10/2000 |
| WO | WO 02/23329 A2 | 3/2002 |

OTHER PUBLICATIONS

International Search Report dated Feb. 28, 2005 issued in International Application No. PCT/JP2004/016072.

Audsley N.C. et al. "Hard Real-Time Scheduling: The Deadline-Monotonic Approach", Proceedings of the IFAC/IFIC Workshop, Jun. 23, 1992, pp. 55-60.

Chia Shen et al., "Resource Reclaiming in Multiprocessor Real-Time Systems", IEEE Transactions on Parallel and Distributed Systems, IEEE, New York, US, vol. 4, No. 4, Apr. 1, 1993, pp. 382-397.

Leung J Y-T, et al., "On the Complexity of Fixed-Priority Scheduling of Periodic, Real-Time Tasks", Performance Evaluation, Amsterdam, NL, vol. 2, No. 4, Dec. 1982, pp. 237-250.

International Search Report dated Mar. 14, 2005 issued in International Application No. PCT/JP2004/017225.

Russinovitch, M. Inside the Windows NT Scheduler, p. 2, Online, Aug. 1997, pp. 1-6, URL: http://www.windowsitpro.com/Articles/Print.

International Search Report dated Nov. 16, 2005 issued in International Application No. PCT/JP2004/018442.

Andre. J-M et al., "OX: ADA Cyclic Executive for Embedded Applications", International Symposium on On-Board Real-Time Software Isobrts, Jan. 1996, pp. 241-245.

Baker T.P. et al., "The Cyclic Executive Model and ADA", Proceedings of the Real Time Systems Symposium, Huntsville, Dec. 6-8, 1988, pp. 119-129.

Anonymous, "Providing an Application with Limited Control of Preemption", IBM Technical Disclosure Bulletin, vol. 38, No. 9, Sep. 1, 2995, pp. 187-188.

\* cited by examiner (a) A1

A2

A3

(b) A1

A2

A3

DETERMINING WHETHER TO EXECUTE A NEW TASK BY DELETING TASK OBJECTS OF EXISTING TASKS

TECHNICAL FIELD

The present invention relates, in multitask systems, to a task management device having an execution security function corresponding to amount of system resources, and a device for determining executability of a program.

BACKGROUND ART

In inter-computer communication, there has been a marked increase in demands for carrying out communication of real time information for video and audio in recent years. With real time communication terminals for handling video and audio, for example, it is necessary to execute a plurality of tasks, such as tasks for receiving video and audio information from another terminal, tasks for indicating received information, and tasks for transmitting information to another terminal. Therefore, this terminal becomes a multitask system for executing a plurality of tasks requiring real time processing, and is required to ensure service quality (QoS: Quality of Service).

In this type of multitask system, as technology for ensuring service quality a task priority setting function of an OS (Operating System) is used to set the priority of tasks required to be dealt with in real time for handling video and audio high than for other tasks, and a technique for giving precedence to processing of tasks with severely delayed requests is generally used. Also, as another technique for ensuring service quality, there has been proposed a method, in a task having execution termination target time set, of, by carrying out processing in a prioritized manner such that priority is increased as this execution termination target time is approached, causing completion of task processing up to the execution termination target time (Japanese Patent Laid-open No. Sho. 62-284437).

There has also been proposed a multitask system for executing periodic tasks and executing the tasks that require delay securement from execution time, as a task management method for controlling service quality of an application program by ensuring task delay of all tasks requiring delay ensuring and controlling execution of tasks (for example, Japanese Patent laid-open No. Hei. 10-171667). There has also been proposed, in a multitask system, a multitask system for automatically correcting required processing time and permitted delay time set for each task based on actual task processing time, and executing tasks (Japanese Patent laid-open No. He. 11-259311). There is also new calculation of period used in execution of a task, required processing time and permitted delay time based on actual period and processing time of that task during operation (Japanese patent laid-open No. 2000-56989).

However, with any of these related techniques, when total required resource amount for tasks requiring execution securement exceeds resource amount capable of being provided by a system at that point in time, the system may execute tasks exceeding capacity, it is not possible to execute low priority tasks or tasks requiring new execution reservation, or it is not possible to execute all tasks, and it becomes impossible to execute within a specified deadline permitting delay.

For example, as shown in FIG. 9(a), if a resource amount R1 that a system can provide at a particular point in time is larger than total requirement resource amount of required tasks r1+r2, it is possible for the system to execute all tasks that require execution. However, from this state, in the event that additional task processing for requirement resource amount r3 is necessary, as shown in FIG. 9(b), since total requirement resource amount r1+r2+r3 is larger than resource amount R1 that can be provided, either receipt of additional tasks will be rejected or receipt of all tasks will be rejected.

Also, as shown in FIG. 10(a)-(c), taking a case of tasks A1, A2 and A3 where the period is set to S1, required processing time is set to T1, and deadline (permitted time or permitted delay time such that if processing is completed within that time quality is satisfied) is set to H1, since task A1 and task A2 can satisfy respective deadlines when they are both executed in this order (processing terminates before the deadline), they can be executed together. However, in the event that tasks A1, A2 and A3 are executed in this order, even if the deadlines for tasks A1 and A2 are satisfied, since the deadline for task A3 cannot be satisfied, it is impossible to execute task A3.

Also, when a specific application is actually in operation, for example, when adding a new task, or when correcting some tasks (tasks A1 and A2 described above), in the event that the task structure of that application is modified, if the application after that modification is actually caused to operate with that multitask system, possibility of executing each task can not be judged. Therefore, at the development stage of an application, it is necessary to repeatedly carry out installation and functional verification of prototypes many times, thus prolonging the development period, and in particular, in cases such as portable telephones having a function of downloading applications, it is very complicated in cases where both the transmit and receive sides have various hardware structures.

DISCLOSURE OF THE INVENTION

An object of the present invention is therefore to provide means capable of achieving compatibility between ensuring task delay and efficient execution of tasks.

A further object of the present invention is to provide means capable of rapidly determining executability of a determination object program, such as an application.

A first invention, as disclosed in claim 1, is a task management device, in a multitask system for selectively executing any of a plurality of tasks, being provided with determination means for determining executability of each task based on required resource amount for each task, and task selection means for selecting a task constituting an execution object based on determination result of the determination means, further provided with required resource amount information acquisition means for acquiring required resource amount information for secured sections and controllable sections specified in at least some tasks, wherein the determination means executes the determination by virtually updating a processing level of at least some scheduled tasks within a range of the controllable sections, and the task selection means executes the selection at the processing level determined as being executable.

During a task, there are not a few cases where a user is permitted to lower execution quality by a certain degree, such as, for example, resolution of an image or frame rate of a video (number of images per second). Therefore, it is unreasonable to reject tasks of low priority or tasks that are newly required to be scheduled, even though there are sections that can be removed in high priority tasks or tasks currently being executed.

In the first invention, this point is dealt with by dividing that part of the tasks into secure sections and controllable sections and setting in a stepwise manner, and then making the latter sections that can be controlled, that is, added, deleted, increased or reduced, depending on the situation. Specifically, with the first invention, the determination means determines executability of each task by virtually updating a processing level of at least some tasks that have been reserved within a range of controllable sections, based on required resource amount of each task, and the task selection means executes selection of a task that will constitute an execution object at the processing level determined as being executable, which means that even when there are external constraints, such as system resource amount, deadlines of each task and execution period, with respect to scheduled tasks, by adjusting quality it is possible to receive and execute low priority tasks and tasks newly requiring scheduling, and it is possible to achieve compatibility between ensuring task delay and efficient execution of tasks.

A second invention is the task management device disclosed in claim 1, wherein the determination means is provided with first determination means for determining whether or not both reserved sections and controllable sections of at least some scheduled tasks are executable, and second determination means for, when it has been determined by the first determination means that execution is not possible, whether or not a secured section of the scheduled task is executable, and wherein the task selection means selects both secured sections and controllable sections for each scheduled task that has been determined as executable by the first determination means, and only selects secured sections of each scheduled task determined as being executable by the second determination means.

With the second invention, determination processing and quality adjustment are carried out by adding or deleting controllable sections. Specifically, as shown in FIG. 4(a), required resource amounts r1, r2 for each task are previously divided into required resource amounts r1a, r2a relating to secured sections, and required resource amounts r1b, r2b relating to controllable sections, and when, for example, it is necessary to register a new task (FIG. 4(b)) having required resource amount r3, first of all it is determined whether or not secured sections and controllable section of all required tasks (required resource amount r1+r2+r3) are executable, and when they are determined to be executable those secured sections and controllable sections are selected. On the other hand, in the event that it is determined that secured sections and controllable sections are not executable, it is then determined whether or not only the secured sections of all required tasks are executable (FIG. 4(c)), required resource amount r1a+r2a+r3a) are executable, and in the event that they are determined as being executable only the secured section of each task is selected. In this manner, with the second invention, since required resource amount is adjusted by adding or deleting controllable sections, it is possible to obtain the same effects as the first invention with a simple structure.

A third invention, as disclosed in claim 3, is the task management device of claim 1, wherein the determination means virtually adjusts processing level of all scheduled tasks within a range of the controllable sections.

With the third invention, since processing level is virtually adjusted for all scheduled tasks, it is permissible to have large variation in required resource amount as a result of large adjustment amount.

Determination by the determination means of the present invention is carried out when variation in required resource amount is anticipated, but is particularly preferred, while it is also possible, as in a fourth invention, to carry out determination when it is necessary to change a number of tasks constituting processing objects, and as in a fifth invention, to carry out determination when it is necessary to change parameters in at least some tasks. Also, parameters of the fifth invention are preferably the at least some task deadlines in a sixth invention, and the at least some task execution periods in a seventh invention.

An eight invention, as disclosed in claim 8, is the task management device of claim 1, further comprising secure object identifier acquisition means for acquiring a secure object identifier for identifying secure sections and controllable section of at least some tasks, and wherein the task selection means carries out the selection using the secure object identifier.

With the invention of claim 8, since the task selection means can select a task constituting an execution object using the secure object identifier, it is possible to obtain the same effects as the first invention with a simple structure.

A ninth invention, as disclosed in claim 9, is the task management device of claim 1, further provided with order identifier acquisition means for acquiring an order identifier for identifying a selection order for a plurality of controllable sections attached to a plurality of controllable sections contained in at least some tasks, and wherein the determination means selects controllable sections selected from among tasks constituting execution objects using the order identifier and according to that selection order, and also trials the selection and determination while changing the object of selection.

With the ninth invention, as a result of the determination means selecting controllable sections of tasks constituting execution objects using the order identifier and according to that selection order, and trialing the selection and determination while changing the object of selection, it is possible to more finely adjust required resource amount for that task.

A tenth invention, as disclosed in claim 10, is the task management device of claim 1, further comprising main/sub task identifier acquisition means for obtaining a main/sub task identifier to identify a prescribed main task and sub tasks in which execution of the main task is the condition for execution, and wherein the determination means and the task selection means, using the main/sub task identifier, process the main task as the secure section, and process the sub task as the controllable section.

With the tenth invention, since a plurality of tasks having a main/subordinate relationship are processed together as secure sections and controllable sections using the main/sub task identifier, processing of controllable section within a task and processing of a main/subordinate relationship between the tasks can be executed using a common algorithm.

An eleventh invention, as disclosed in claim 11, is a task management method, in a multitask system for selectively executing at least some of a plurality of tasks, comprising a determination step for determining executability of each task based on a required resource amount for each task, and a task selection step for selecting a task constituting an execution object based on determination result in the determination step, further provided with a required resource amount information acquisition step for acquiring required resource amount information for secured sections and controllable sections specified in at least some tasks, wherein in the determination step, the determination is executed by virtually updating a processing level of at least some scheduled tasks within a range of the controllable sections, and in the task selection step the selection is executed using the processing level determined as being executable. According to the eleventh invention, it is possible to obtain the same effects as the first invention.

A twelfth invention, as disclosed in claim 12, is the task management method of claim 11, further including a secure object identifier acquisition step for acquiring a secure object identifier for identifying secure sections and controllable sections of at least some tasks, and wherein in the task selection step the selection is carried out using the secure object identifier. According to the twelfth invention it is possible to obtain the same effects as the eighth invention.

A thirteenth invention, as disclosed in claim 13, is the task management method of claim 11, further including an order identifier acquisition step for acquiring an order identifier for identifying a selection order for a plurality of controllable sections attached to a plurality of controllable sections contained in at least some tasks, and wherein, in the determination step, controllable sections selected from among tasks constituting execution objects are selected using the order identifier and according to that selection order, and also the selection and determination are trialed while changing the object of selection. According to the thirteenth invention, it is possible to obtain the same effects as the ninth invention.

A fourteenth invention, as disclosed in claim 14, is the task management method of claim 11, further including a main/sub task identifier acquisition step for obtaining a main/sub task identifier for identifying a prescribed main task and sub tasks in which execution of the main task is the condition for execution, and wherein, in the determination step and the task selection step, using the main/sub task identifier, the main task is processed as the secure section, and the sub task is processed as the controllable section. According to the fourteenth invention it is possible to obtain the same effects as the tenth invention.

A fifteenth invention, as disclosed in claim 15, is a program, in a multitask system for selectively executing any of a plurality of tasks, for causing the system to execute determination processing for determining executability of each task based on required resource amount for each task, and task selection processing for selecting a task constituting an execution object based on determination result of the determination means, further including required resource amount information acquisition processing for acquiring required resource amount information for secured sections and controllable sections specified in at least some tasks, wherein, in the determination processing, the determination is executed by virtually updating a processing level of at least some scheduled tasks within a range of the controllable sections, and in the task selection processing the selection is executed using the processing level determined as being executable. According to the fifteenth invention, it is possible to obtain the same effects as the first invention.

As with a sixteenth invention, a program used in relation to the task management method of the present invention is provided with required resource amount information storage means for storing required resource amount before and after change of task processing level, while in a seventeenth invention there is provided a secure object identifier for identifying secure sections and controllable sections of a task. If an eighteenth invention is provided with an order identifier for identifying an order of a plurality of controllable sections contained in a task, it can handle a program to be executed and various task information contained in the program as a set.

Also, as in a nineteenth invention, if a program used in relation to the task management method of the present invention is provided with the secure object identifier so as to cause a prescribed main task to be recognized by the system as a secure section, and cause a sub task constituting execution conditions of the main task to be recognized by the system as a controllable section, since it is possible to process a plurality of tasks having a main/sub relationship together as secure sections and controllable sections using a main/sub task identifier, it is possible to execute processing for controllable sections within a task and processing for a main/subordinate relationship between the tasks using a common algorithm. On the other hand, as in a twentieth invention, instead of the secure object identifier, it is possible to provide a main/sub task identifier for processing of a main/sub relationship.

A twenty-first invention, as disclosed in claim 21, is an operation determination device, for determining executability of a program containing a plurality of tasks in a system, comprising structural information acquisition means for acquiring information of tasks constituting a determination object program as structural information, function extraction means for extracting a combination of the tasks which can be a single function by simultaneous execution based on the structural information, required resource amount information acquisition means for acquiring information on resource amount required for execution of the respective tasks, and determination means for determining executability with respect to all functions possessed by the object determination program based on the extracted task combinations and the required resource amount information.

With the twenty-first invention, structural information of a determination object program, that is, information relating to association between tasks, and required resource amount information for each task, is acquired, and based on this information the function extraction means extracts combinations of tasks which can be a single function by simultaneous execution. Then, the determination means determines executability with respect to all functions possessed by the object determination program based on the extracted task combinations and the required resource amount information. Therefore, with the twenty-first invention, since it is possible to determine executability without actually executing operations of a determination object program, determination of executability can be speeded up.

A twenty-second invention, as disclosed in claim 22, is the operation determination device of claim 21 further provided with required resource amount correction means for correcting required resource amount for tasks whose required resource amount is controllable and variable, from among the plurality of tasks, wherein the determination means, when it is determined that execution is not possible, further determines executability for all functions possessed by the determination object program based on extracted task combination and the required resource amount after correction.

With the twenty-second invention, when determination by the determination means is not executable, the required resource amount correction means corrects required resource amount for variable tasks, and further determines executability based on required resource amount after correction. Therefore, even if it is determined once that execution is not possible, once it becomes determined, as a result of slightly changing service quality, that execution is possible, it is possible to reduce the number of processes for operation confirmation due to realization of that type of change.

A twenty-third invention, as disclosed in claim 23, is the operation determination device of claim 21, wherein the determination means determines executability when a plurality of determination object programs are executed in parallel in the system.

With the twenty-third invention, since executability is determined when a plurality of determination object programs are executed in parallel, it is possible to achieve good repeatability of external conditions at the time of execution of the determination object program, and it is possible to carry out correct operation determination.

A twenty-fourth invention, as disclosed in claim 24, is an operation determination method for determining executability of a program containing a plurality of tasks in a system, including a structural information acquisition step for acquiring information of tasks constituting a determination object program as structural information, a function extraction step for extracting a combination of the tasks which can be a single function by simultaneous execution based on the structural information, a required resource amount information acquisition step for acquiring information on resource amount required for execution of the respective tasks, and a determination step for determining executability with respect to all functions possessed by the object determination program based on the extracted task combinations and the required resource amount information. With the twenty-fourth invention, it is possible to obtain the same effects as the twenty-first invention.

A twenty-fifth invention, as disclosed in claim 25, is the operation determination method of claim 24, further including a required resource amount correction step for correcting the required resource amount which is controllable and variable from among the plurality of tasks, and wherein, in the determination step, when it has been determined that execution is not possible executability is further determined for all functions possessed by the determination object program based on the extracted task combination and the required resource amount after correction. With the twenty-fifth invention, it is possible to achieve the same effects as the twenty-second invention.

A twenty-sixth invention, as disclosed in claim 26, is the operation determination method of claim 24, wherein, in the determination step, executability is determined when a plurality of determination object programs are executed in parallel in the system. With the twenty-sixth invention, the same effects as the twenty-third invention are obtained.

A twenty-seventh invention, as disclosed in claim 27, is an operation determination program, for determining executability of a program containing a plurality of tasks in a system, for causing execution, on a computer, of structural information acquisition processing for acquiring information of tasks constituting a determination object program as structural information, function extraction processing for extracting a combination of the tasks which can be a single function by simultaneous execution based on the structural information, required resource amount information acquisition processing for acquiring information on resource amount required for execution of the respective tasks, and determination processing for determining executability with respect to all functions possessed by the object determination program based on the extracted task combinations and the required resource amount information. With the twenty-seventh invention, it is possible to obtain the same effects as the twenty-first invention.

As with a twenty-eighth invention, a program used in relation with the task management device of the present invention can be provided with structural information storage means for storing structural information about the determination object program, while in a twenty-ninth invention if required resource amount information storage means for storing information about resource amount required for execution of each function is provided, it is possible to handle a determination object program to be executed and task information contained in the program as a set.

PREFERRED MODE FOR CARRYING OUT THE INVENTION

Figure 1:
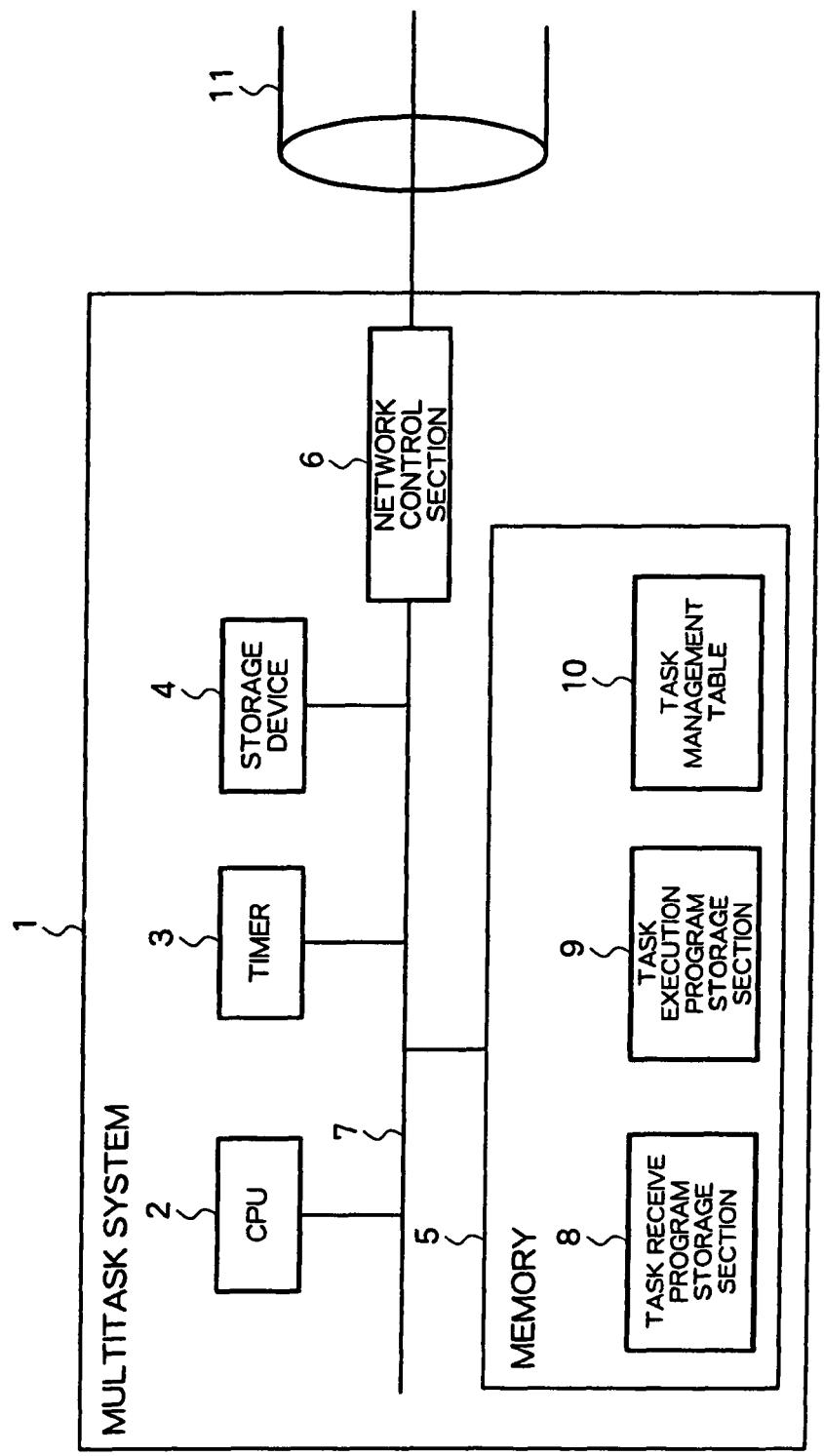
FIG. 1 is a block diagram of a multitask system relating to a first embodiment of the present invention.

Respective embodiments of the present invention will be described in the following with reference to the drawings.
First Embodiment In FIG. 1, a multitask system 1 of an embodiment of the present invention comprises a CPU 2, a timer 3, a storage device 4, such as a hard disk etc., memory 5, a network 11, and a network controller 6 constituting an interface to the network 11. The CPU 2, timer 3, storage device 4, memory 5 and network controller 6 are connected by an internal bus 7.

The timer 3 is repeatedly clocked until a set specified time, and is capable of notifying the CPU 2 of the elapsing of a specified time, by interrupting the CPU 2 every set time. A task program etc. is stored in the storage device 4, and the memory 5 is read as required.

In realizing a task management function of the present invention, CPU control is necessary. In order to do this, it is necessary to incorporate a task management into an OS (Operating System). Therefore, a task receive program storage section 8 for storing a task receive program for causing task receive processing, which will be described later, to be executed by the CPU 2, and a task execution program storage section 9 for storing a task execution program for causing task execution processing to be executed by the CPU 2, exist in a region in the memory 5 where the OS is loaded. By loading these programs from the storage device 4 into the storage sections 8 and 9, the task management functions of the present invention are incorporated into the OS.

As resource amount of this embodiment, usage time of the CPU 2 is used. As the resource amount of the present invention it is also possible to selectively use all of usage time or storage capacity of devices other than the CPU 2, such as the storage device 4, the memory 5 or a video memory, not shown, network communication speed, network server storage capacity, memory capacity, or hardware resources or software resources required in order to execute a specific task. Different resource amounts can be used according to task type or function. For example, in the case where a task relates to data reading, the resource amount can be hard disk storage capacity, and usage time and capacity of the memory, while in the case where a task relates to signal processing the resource amount can be usage time of the CPU 2 and usage time and storage capacity of the memory, and in the case where a task relates to image output the resource amount can be usage time of the CPU 2, usage time and storage capacity of the memory, and usage time and storage capacity of the video memory.

With this embodiment, a secure section and a controllable section are set in advance for each task. For example, in the case where a task is an audio playback program, the secure section is a processing section relating to decode processing, and the controllable section is a processing section relating to supplemental processing for achieving high quality sound.

Also, in the case where the task is an MPEG moving picture playback program, the secure section is a processing section corresponding to a frame rate of $1/15^{th}$ of a second between images, and the controllable section is a processing section corresponding to a frame rate of $1/30^{th}$ of a second between images. If a task is a still picture or moving picture playback program, it is possible to adjust resolution by making a processing section corresponding to the lowest resolution that the human eye can tolerate a secure section, and making a processing section corresponding to a resolution higher than a controllable section.

Also, if an application is a web browser, a secure section is a processing section corresponding to communication rate for a packet communication interval within a network timeout period, and a controllable section is a processing section corresponding to a communication rate for a higher communication rate, for example (packet size/throughput).

With an application program of this embodiment, secure section program statements and controllable section program statements of each task are described separately from each other, and a specified secure object flag is attached to the secure section memory address as a secure object identifier of the present invention.

The secure sections of each task, that is, resource amounts to secure lower limit allocations, are measured using a time measurement function of a scheduler program of the hardware or software environment under which execution is carried out. Specifically, a resource amount to be secured at the lower limit is measured in advance by measuring the time each resource is used, in each assigned period, from the start of execution of object processing to completion. Also, the deadline of each task can be measured by shifting execution start timing of a process back, in each assigned period, and measuring a window period until quality is no longer satisfied. It is also possible to calculate resource amount for the controllable sections by subtracting a measurement value for a secure section from a value measured using the same scheduler function while executing processing using the highest processing quality for each task. These items of resource amount information can also be obtained by actually performing these measurements on the system, or directly using specification values obtained from an application program vendor.

Also, in order to managing tasks that require real time, namely tasks that require a small delay time (in the following this type of task will be called a task requiring delay securement), a task management table 10 for storing information for each of these tasks exists in the memory 5.

Figure 2:
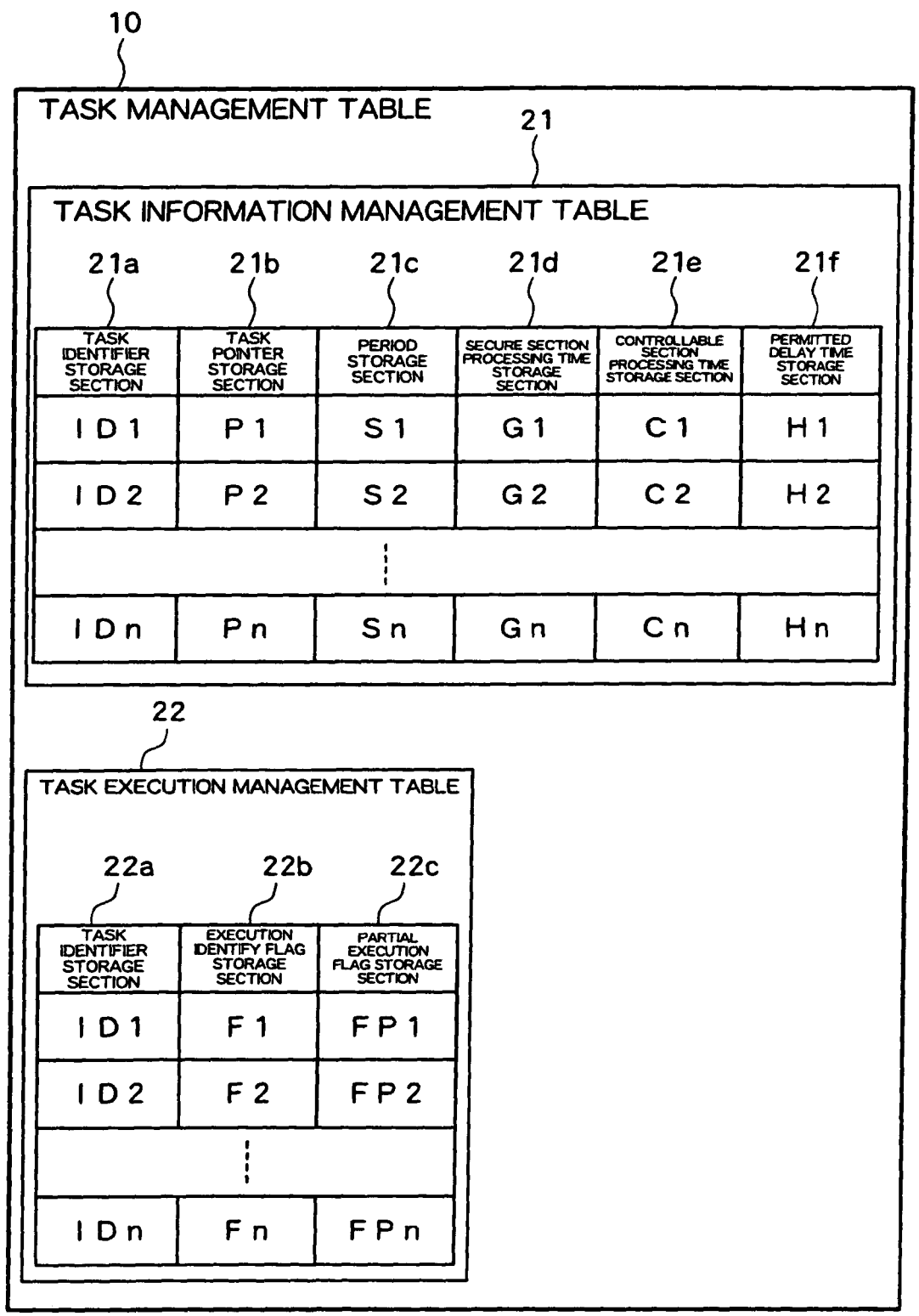
FIG. 2 is an explanatory drawing showing a task management table.

FIG. 2 is a drawing showing one example of the task management table 10. The task management table 10 is made up of a task information management table 21 and a task execution management table 22.

The task information management table 21 is a table for managing information relating to tasks that require delay securement received through task receive processing, which will be described later.

The information stored in this task information management table 21 contains task identifier ID, task pointer P, periods, S, secure section processing times G, controllable section processing times C and deadlines H respectively stored in a task identifier storage section 21a, a task pointer storage section 21b, a period storage section 21c, a secure section processing time storage section 21d, a controllable section processing time storage section 21e and a permitted delay time storage section 21f, and these items of information are respectively stored for each task.

FIG. 2 shows information relating to one task on one horizontal row.

The task identifier ID identifies each task, while the task pointer P indicates the position of each task program in the storage device 4 or memory 5. The period S is a time from the point in time where execution of each task starts to the point in time where the next execution starts, and if a particular task is executed, that task will not be permitted to newly execute during the set period S.

The secure section processing time G is required resource amount for a secure section of the present invention, and is a processing time required for execution of the secure section of each task. The controllable section processing time C is a required resource amount or a controllable section of the present invention, and is the processing time required for execution of a controllable section of each task. The secure section processing time G and the controllable section processing time C are sample values that are set in advance, which means that sometimes actual tasks may be completed before these values.

The deadline H is a permitted time such that if processing is completed within that time quality is satisfied, and is set to within the time represented by period S. In a state where an event has occurred for a particular task, if the elapsed time from the point in time where the previous execution commenced has exceeded the period S, or if task processing is interrupted, a delay arises in that task. The occurrence of this type of delay means that the permitted delay time H is used up. It is therefore necessary to complete task processing before this permitted delay time is used up completely.

These parameters period S, secure section processing time G, controllable section processing time C and deadline H are held in advance in an application program requiring this task to be scheduled, stored in the storage device 4 as a result of installation by means of storage medium external to this application medium or a network and transferred into the OS as a result of a system call, that will be described later. If receipt is permitted, these parameters are then stored in the task management information table 21 with a task identifier ID3 attached.

A task execution management table 22 is a table for managing received tasks, namely information used at the time of execution of a task registered in the task information management table 21. As information stored in this task execution management table 22, there are a task identifier ID, execution identity flag F, and a partial execution flag FP, and these items of information are respectively stored in a task identifier storage section 22c, execution identity flag storage section 22b and partial execution flag storage section 22c for each task.

The execution identity flag F is for identifying a task being execution or having execution interrupted. This execution identity flag F is set (for example, to "1") if each task enters a being executed or having execution interrupted state, and is reset (for example, to "0") when task execution is completed.

The partial execution flag FP is for identifying tasks for which an execution object is only a secure section. This partial execution flag FP is set (for example, to "1") if the execution object of each task is only a secure section, and reset (for example to "0"), if execution objects for each task are both secure sections and controllable sections.

Next, task receive processing required for delay securement will be described using FIG. 3. For example, if required resource amounts r1, r2 and r3, required resource amounts r1a, r2a and r3a relating to secure sections, required resource amounts r1b, r2b and r3b relating to controllable sections, and deadlines H1, H2 and H3 are set in advance for tasks A1, A2 and A3, tasks A1 and A2 are set to already scheduled. If the scheduling of a new task Aw is then required due to a system cal from an application, the CPU 2 executes the processing described in the following in accordance with a program stored in the task receive program storage section 8.

Figure 3:
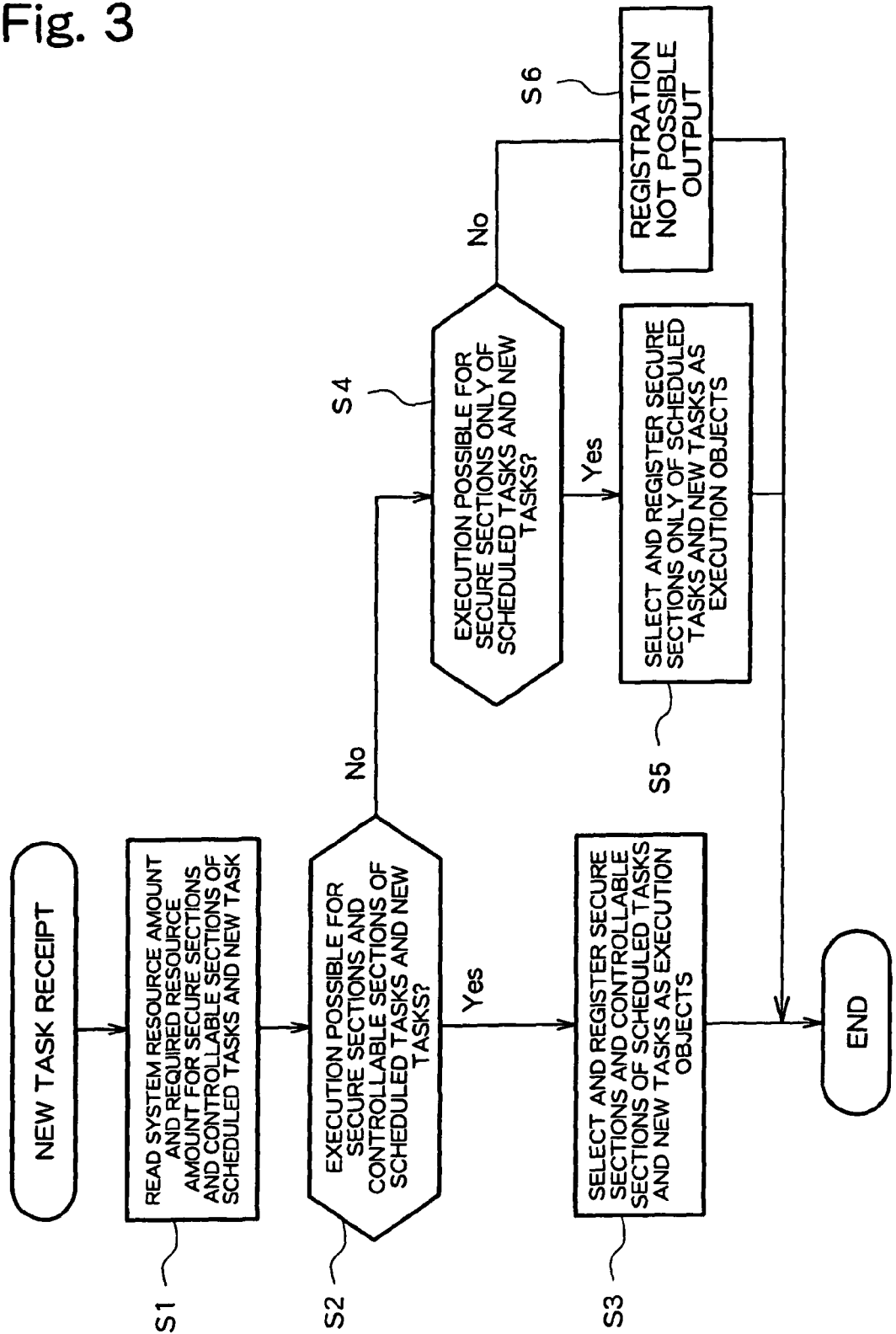
FIG. 3 is a block diagram showing task receive processing of the first embodiment.
Figure 4:
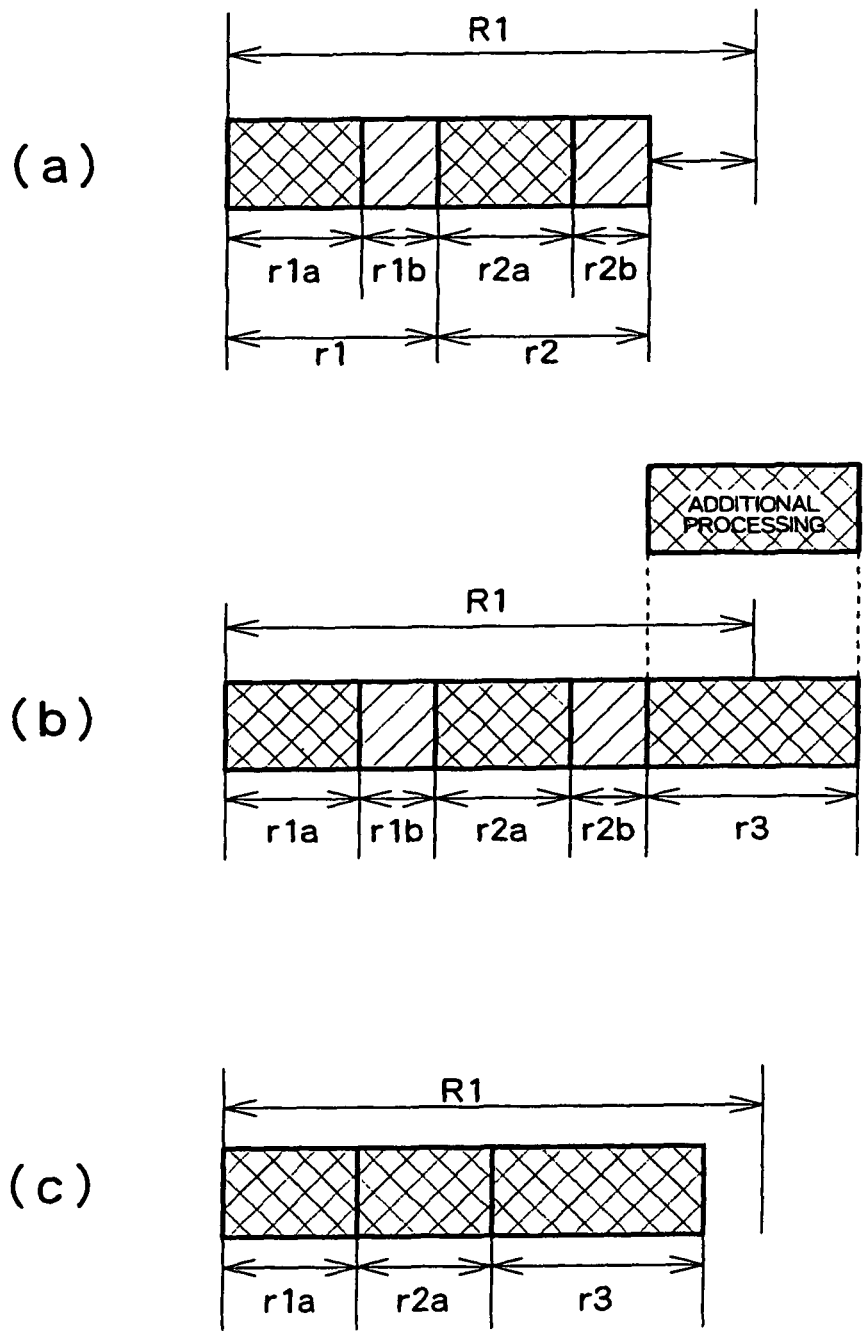
FIG. 4 is an explanatory drawing showing operation of the present invention.

In FIG. 3, first of all the CPU 2 reads current resource amounts of the system, respective required resource amounts for secure sections and controllable sections of scheduled tasks A1 and A2 already received, and respective required resource amounts for secure sections and controllable sections of the new task A3 (S1). Respective required resource amounts for the scheduled tasks A1 and A2 are extracted from the task management table 10 based on information registered in the task information management table 21. Also, respective required resource amounts for the new task A3 are input together with the system call, and saved in a specified region of the memory 5.

Next, it is determined whether or not all secure sections and controllable sections (required resource amounts r1+r2+r3) of the scheduled tasks A1 and A2 and the task A3 newly requiring scheduling are executable, based on comparison of the deadlines H1, H2 and H3 of each task, which are external constraints (S2).

If executable is determined in S2, secure sections and controllable sections of these tasks A1, A2 and A3 are selected as execution objects and registered in the task information management table 21 (S3).

Figure 5:
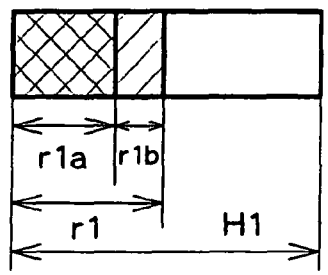
FIG. 5 is an explanatory drawing showing operation of the first embodiment.
Figure 5:
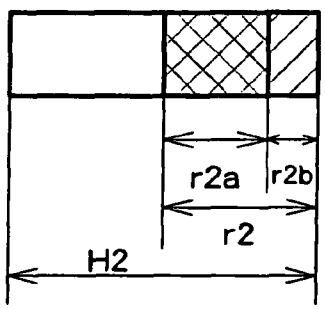
Figure 5:
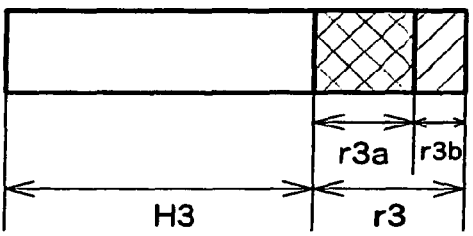
Figure 5:
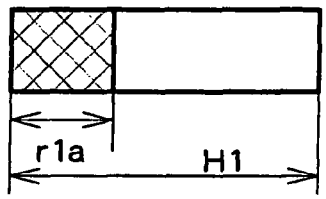
Figure 5:
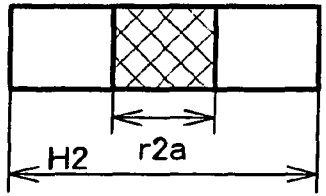
Figure 5:
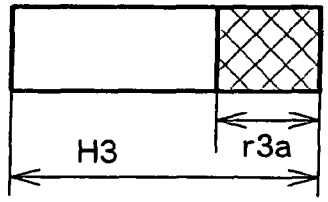

On the other hand, in cases such as when, as in the example of FIG. 5(a), the deadline H3 for task A3 is not satisfied and a delay time arises when it is assumed that the secure sections and controllable sections of each task A1, A2 and A3 are executed in order, execution not possible is determined in step S2, and then as required source amount for secure sections of all required tasks the total of secure section processing time G for each task is compared with the deadline of each task H1, H2, H2 to determine whether or not all tasks (FIG. 5(b), required resource amount r1a+r2a+r3a) are executable (S4).

If execution possible is determined, only secured sections of all tasks are selected as execution objects, and registered in the task information management table 21 (S5) Specifically, when delay securement of the requested new task A3 and the received tasks A1 and A2 is possible receipt is permitted, task identifiers ID1, ID2 and ID3 of each task A1, A2 and A3 and partial execution flags FP representing that only secured sections are the execution object are written to the task management table 10 in the memory 5, and then the designation representing that only secure sections have been received as execution objects is returned to the application and receive processing is completed.

When it is determined in step S4 that execution is not possible, a new task can not be scheduled and a registration not possible signal to that effect is output (S6), and a can not receive designation is notified to the application side. As a result of the application processing, a designation that registration of a new task is not possible is provided to a user using a test message on a display device, not shown in the drawings, and the user can respond to this by closing unnecessary applications etc.

Figure 6:
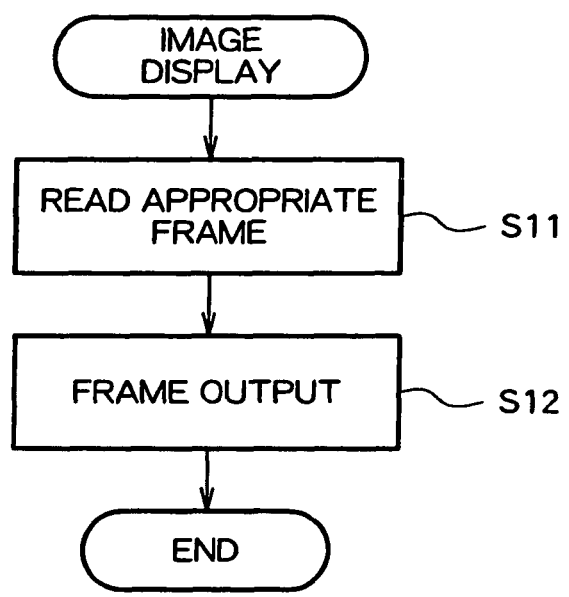
FIG. 6 is a block diagram showing image display processing of the first embodiment.

As a result of the above described processing, the tasks A1, A2 and A3 respectively satisfy the deadlines H1, H2 and H3, and resource allocation for secure sections only is executed reliably. The start timing for execution of each task is controlled by a system scheduler, which means that, for example, when a task relates to moving picture display, execution of that task is sufficient if there is a structure for each function such as reading the frame (S11) and frame output (S12), as shown in FIG. 6, and it is not necessary to carry out execution timing processing for each task at the application side using a timer, for example.

As described above, with the first embodiment, tasks A1, A2 and A3 are divided into secure sections and controllable sections, with the latter treated as sections that can be controlled, that is deleted, according to the situation. Specifically, with this embodiment, together with determining executability of task A3 that has newly required scheduling while virtually changing processing level of scheduled tasks A1 and A2 between the two cases of including controllable sections and not including controllable sections, selection of tasks A1, A2 and A3 constituting determination objects is carried out using executability and determined processing level. Therefore, with this embodiment, it is possible to execute receipt of task A3 newly requiring scheduling by adjusting quality of scheduled tasks A1 and A2, and it is possible to simultaneously secure task delay and efficient task execution.

Also with this embodiment, since determination processing and quality adjustment are carried out by adding or deleting controllable sections, it is possible to obtain the desired effect in the present invention with a simple structure.

With this embodiment, because virtual changing of task processing level is carried out for all of the scheduled tasks A1 and A2 and the task A3 that required scheduling, it is possible to permit large variation in required resource amount.

Also, since with this embodiment it is possible to select task that constitute execution objects using secure object identifiers, it is possible to achieve the desired effect in the present invention with a simple structure.

With this embodiment, description has been given for a structure for selecting priority of each task without specially taking the priority into consideration, but it is also possible for each task to be registered according to a prescribed priority (for example, lowering priority as sum of required processing time and permitted delay time for a task becomes large, or making it necessary to fit required processing time of high priority tasks within permitted delay time of low priority tasks).

Second Embodiment

Next, a second embodiment will be described. With the first embodiment described above, when there were requests to change task numbers constituting processing objects, executability was determined while virtually changing required resource amount. However, even if there is no task number change request, for example, in the case of fast forwarding a film or audio clip, there may be cases where variation in required resource amount is expected, and in such cases it is preferable to implement determination of executability while carrying out determination of the present invention, that is, virtually changing required resource amount. The second embodiment carries out this type of determination in cases where there is a request to change a parameter in at least some tasks, and particularly a deadline change request. With the second embodiment also, the structure of the multitask system is the same as that of the first embodiment, and so description of the multitask system will be omitted.

During execution of tasks A1, A2 and A3, for example, if change of the deadline for task A3 (for example, subtracting a specified value from a reference value) is requested as a result of a system call from an application, the CPU 2 executes the processing described below in accordance with a program stored in a task receive program storage section 8.

Figure 7:
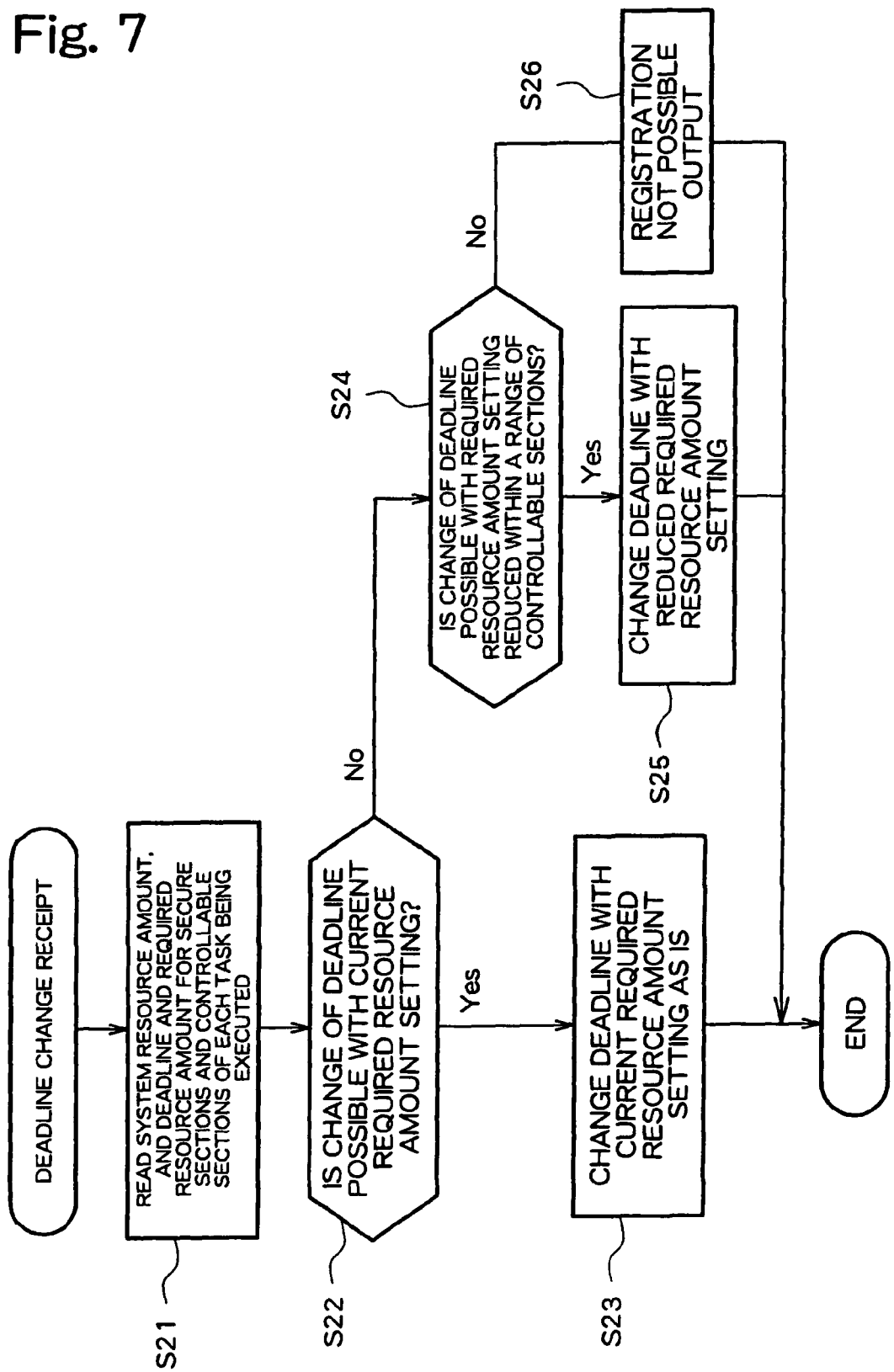
FIG. 7 is a block diagram showing deadline update receive processing of a second embodiment.

In FIG. 7, first of all the CPU 2 reads current system resource amount, deadlines for tasks A1, A2 and A3 being executed, and respective required resource amounts for secure sections and controllable sections (S21).

Next, determination of whether or not deadline change is possible with the current required resource amount is determined based on comparison of required resource amounts (both secure sections and controllable sections) for tasks A1, A2 and A3 when the deadlines have been virtually changed, and the deadline for each task (after change), which are external constraints (S22).

If it is determined in step S22 that execution is possible, the deadline for task A3 is changed using the current required resource amount setting (that is, the state where secure sections and controllable sections of tasks A1, A2 and A3 have been selected), and registered in the task information management table 21 (S23).

On the other hand, if it is determined in step S22 that execution is not possible, next, for the required resource amount setting reduced within a range of the controllable sections (that is, required resource amount of the secure sections only), it is determined whether or not it is possible to change the deadline based on optimization calculation for this case and comparison of deadlines for each task (after change) (S24).

If it is determined that execution is possible, the reduced required resource amount setting is adopted (that is, only the secure sections of all the tasks are selected as execution objects), and the deadlines are changed in that state and registered in the task information management table (S25). Specifically, in a state where a requested deadline change has been performed, receipt is permitted when it is determined that delay securement is possible for tasks A1, A2 and A3, respective task identifiers ID1, ID2 and ID3 for tasks A1, A2 and A3 and a partial execution flag FP indicating that only secure sections are execution objects are written to the task management table 10 in the memory 5, and after indication that only secure sections can be received as execution objects is returned to the application and receive processing is completed.

If it has been determined that execution is not possible in step S24, this is a case where deadline can not be changed, and a change not possible signal indicating this fact is output (S26), and also the fact that receipt is not possible is notified to the application side. As a result of application processing, the fact that deadline change is not possible is presented to a user by means of a text message on a display device, not shown, and the user deals with this by closing unnecessary applications, for example.

As a result of the above described processing, the tasks A1, A2 and A3 respectively satisfy the changed deadlines, and resource allocation for secure sections only is executed reliably. Therefore, with the second embodiment, similarly to the first embodiment, it is possible to continue with execution of deadline change by adjusting quality of tasks A1, A2 and A2, and it is possible to simultaneously secure task delay and efficient task execution.

Third Embodiment

Next, a third embodiment will be described. Similarly to the second embodiment, the third embodiment carries out determination of executability in response to a parameter change request, and is applied to a case where this parameter is a period change request. With the third embodiment also, the structure of the multitask system is the same as that of the first embodiment, and so description of the multitask system will be omitted.

During execution of tasks A1, A2 and A3, for example, if change of the period for task A3 (for example, subtracting a specified value from a reference value) is requested as a result of a system call from an application, the CPU 2 executes the processing described below in accordance with a program stored in a task receive program storage section 8.

Figure 8:
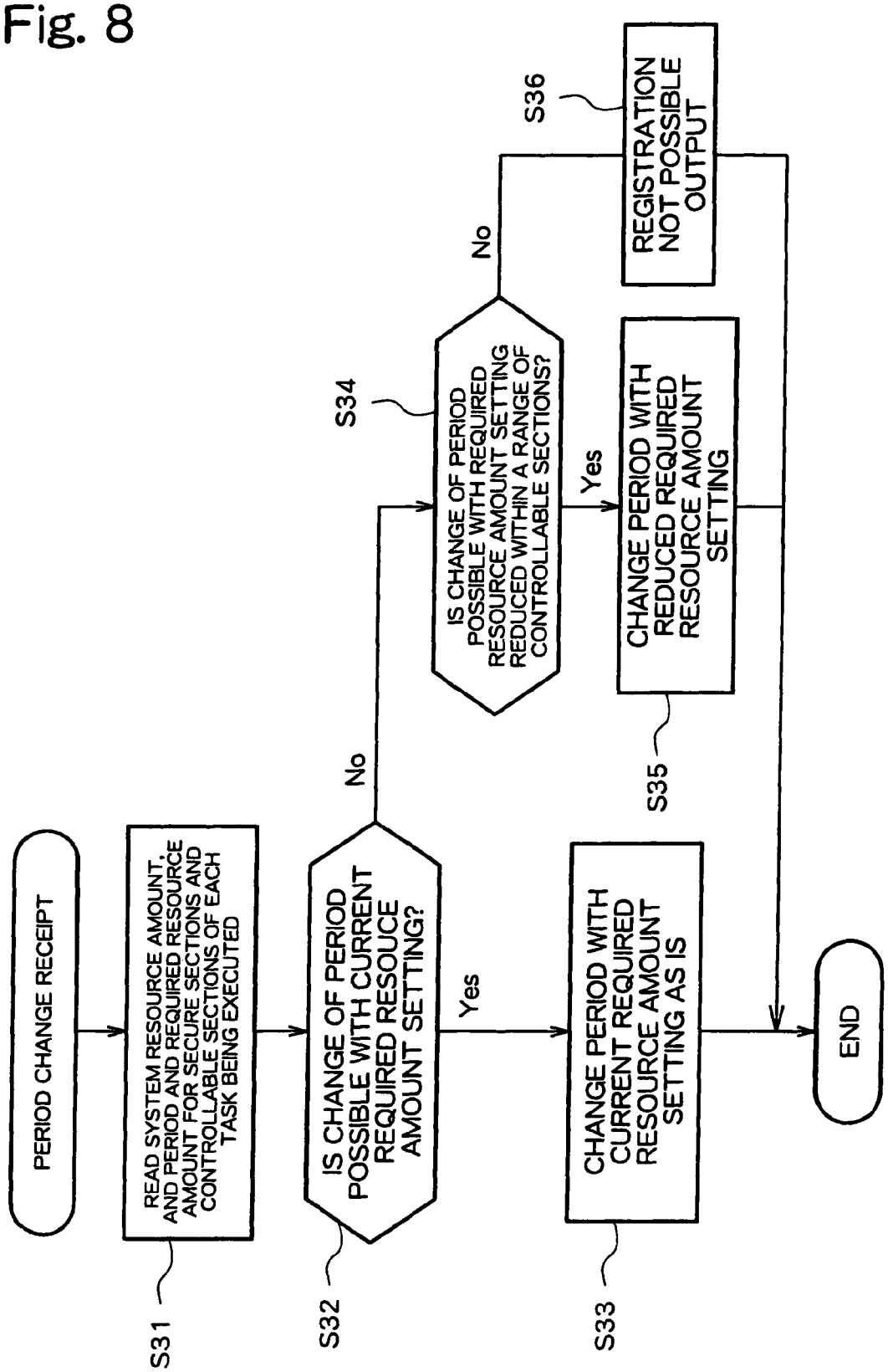
FIG. 8 is a block diagram showing period update receive processing of a third embodiment.
Figure 9:
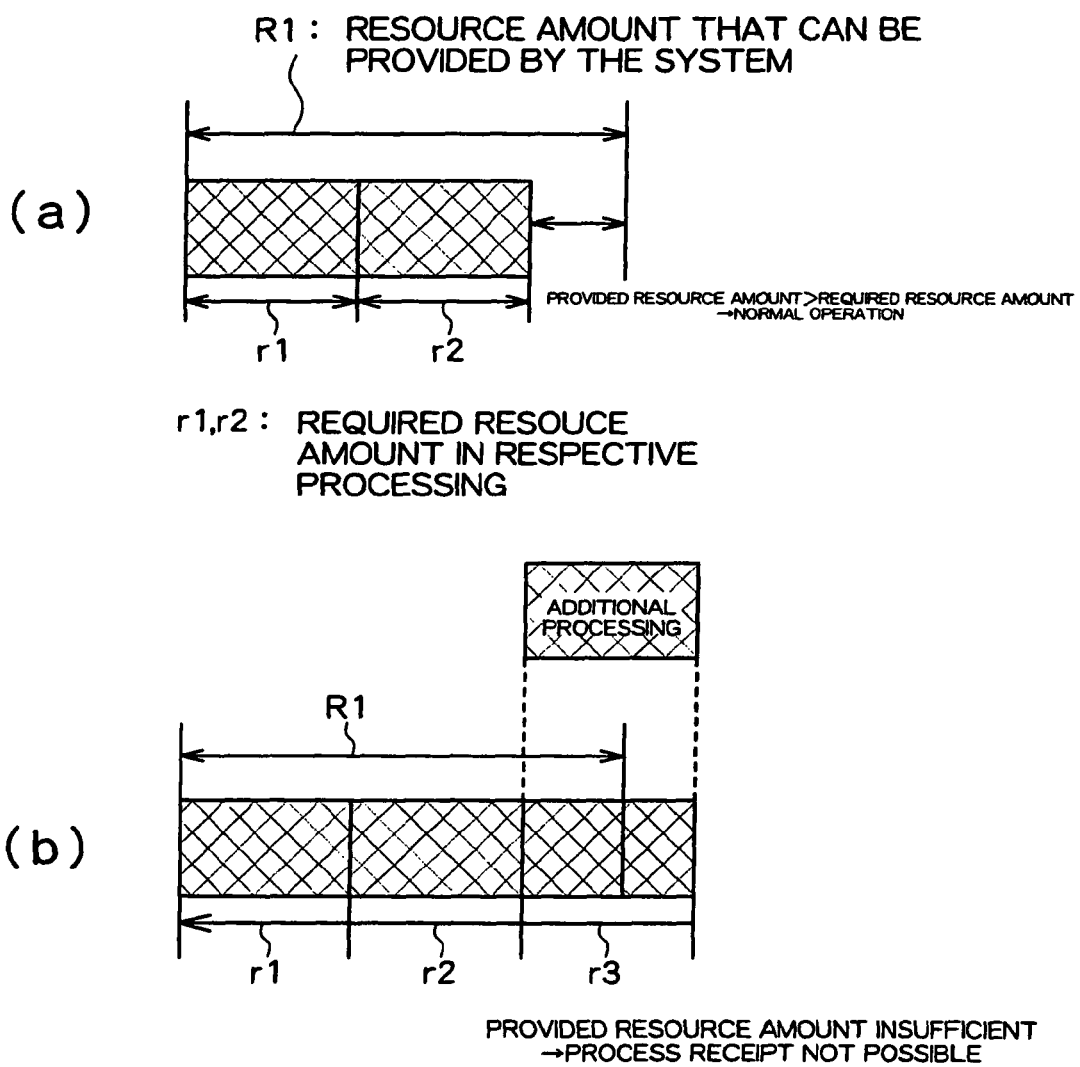
FIG. 9 is an explanatory drawing showing one example of task receive processing before the improvement of the present invention.
Figure 10:
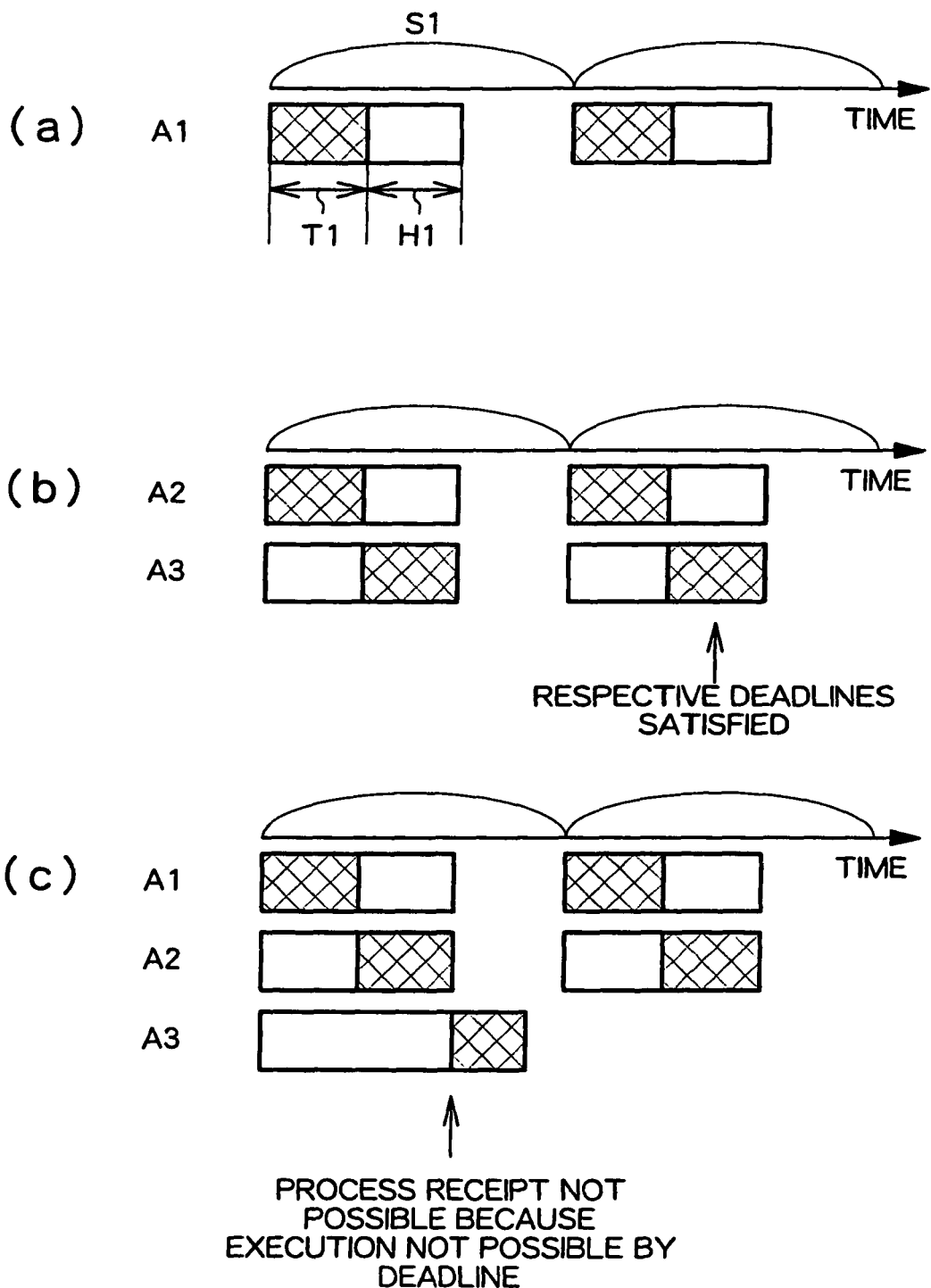
FIG. 10 is an explanatory drawing showing another example of task receive processing before the improvement of the present invention.

In FIG. 8, first of all the CPU 2 reads current system resource amount, periods for tasks A1, A2 and A3 being executed, and respective required resource amounts for secure sections and controllable sections (S31).

Next, determination of whether or not period change is possible with the current required resource amount is determined based on comparison of required resource amounts (both secure sections and controllable sections) for tasks A1, A2 and A3 when the deadlines have been virtually changed, and the execution period for each task (after change).

If it is determined in step S32 that execution is possible, the period for task A3 is changed using the current required resource amount setting (that is, the state where secure sections and controllable sections of tasks A1, A2 and A3 have been selected), and registered in the task information management table 21 (S33).

On the other hand, if it is determined in step S32 that execution is not possible, next, for the required resource amount setting reduced within a range of the controllable sections (that is, required resource amount of the secure sections only), it is determined whether or not it is possible to change the period based on optimization calculation for this case and comparison of execution deadlines for each task (after change) (S34).

If it is determined that execution is possible, the reduced required resource amount setting is adopted (that is, only the secure sections of al the tasks are selected as execution objects), and the periods are changed in that state and registered in the task information management table (S35). Specifically, in a state where a requested period change has been performed, receipt is permitted when it is determined that delay securement is possible for tasks A1, A2 and A3, respective task identifiers ID1, ID2 and ID3 for tasks A1, A2 and A3 and a partial execution flag FP indicating that only secure sections are execution objects are written to the task management table 10 in the memory 5, and after that indication that only secure sections can be received as execution objects is returned to the application, and receive processing is completed.

If it has been determined that execution is not possible in step S34, this is a case where period can not be changed, and a change not possible signal indicating this fact is output (S26), and also the fact that receipt is not possible is notified to the application side. As a result of application processing, the fact that period change is not possible is presented to a user by means of a text message on a display device, not shown, and the user deals with this by closing unnecessary applications, for example.

As a result of the above described processing, the tasks A1, A2 and A3 respectively satisfy the changed periods and resource allocation for secure sections only is executed reliably. Therefore, with the third embodiment, similarly to the second embodiment, it is possible to continue with execution of period change by adjusting quality of tasks A1, A2 and A2, and it is possible to simultaneously secure task delay and efficient task execution.

With each of the above described embodiments, the structure is such that there is one controllable section in each task, and required resource amount is changed according to whether or not there is addition to the secure section of that task. In this case, it is further preferable to mutually set (assign) a selection order in a plurality of controllable sections, and to select these plurality of controllable sections according to this selection order. In particular, it is preferable to attach a specified sequence identifier (for example, a specified sequence flag) to sections respectively corresponding to program statements of each task in order to identify selection order among the plurality of controllable sections, and to store required resource amount for those controllable sections, and then at the time of operation selecting controllable sections of determination object tasks according to a selection order represented by that selection identifier, and carrying out trialing of that selection and determination while changing selection objects (while changing the number of controllable sections selected). With this type of structure, it is possible to finely adjust required resource amount for a task by repeating determination of executability, while reducing processing amount in a stepwise manner by deleting processing objects from sections having a low importance with respect to the operation, and it is possible to effectively utilize system resource amount.

Also, with the first to third embodiments, required resource amount has been adjusted by increasing and decreasing using controllable sections within tasks, but this type of required resource amount adjustment can also be applied to adjustment of operations between a plurality of tasks that have dependency on execution order or a main/sub relationship with each other.

Specifically, when there is a specified main task and a sub task for which execution of the main task is an execution condition, a secure object flag similar to that used in the above described first embodiment is attached to the whole of a main task, and sub tasks are configured with no secure object flag attached. With this type of main task and sub task, when a task receive program of the above described first embodiment is executed as is, the whole of the main task is made a secure section, and the whole of a sub task is made a controllable section, and respectively acknowledged in the system. As a result, when there is margin in the resource amount, the main task and the sub task are both executed, and when there is no margin in the resource amount only the main task is executed, and in this way it is possible to execute processing for controllable sections with a task and processing for main/sub relationships between tasks using a common algorithm, and it possible to economize on task numbers since it is possible to handle main tasks and sub tasks together as a single task.

Instead of the structure where a secure object flag taken as a secure object identifier used in identification of secure sections and controllable sections within a task is used in this way, it is also possible to provide a specified main/sub identifier (for example, a main/sub flag) used in order to identify the main task and sub task in either one or both of the main task and the sub task, and for a task receive program to process a main task as a secure section and process a sub task as a controllable section, which makes it possible to achieve the same effects.

As with the twelfth invention, a program used in relation to the task management device of the present invention is provided with required resource amount information storage means for storing required resource amount before and after change of task processing level, while in the thirteenth invention there is provided a secure object identifier for identifying secure sections and controllable sections of a task. If an order identifier for identifying an order of a plurality of controllable sections contained in a task is provided, as in the eighteenth invention, it is possible to handle a program to be executed and various task information contained in the program as a set.

Also, as in a fifteenth invention, if a program used in relation to the task management device of the present invention is provided with the secure object identifier so as to cause a prescribed main task to be recognized by the system as a secure section, and cause a sub tack constituting execution conditions of the main task to be recognized by the system as a controllable section, since it is possible to process a plurality of tasks having a main/sub relationship together as secure sections and controllable sections using a main/sub task identifier, it is possible to execute processing for controllable sections within a task and processing for a main/subordinate relationship between the tasks using a common algorithm. On the other hand, as in a sixteenth invention, instead of the secure object identifier, it is possible to provide a main/sub task identifier for processing of a main/sub relationship.

With each of the above described embodiments, the structure is such that processing amount is adjusted by virtually deleting the whole of controllable sections, but conversely it is also possible to have a structure such that when there is margin in the resource amount (specifically, when a difference between resource amount that can be currently provided and total required resource amount for all current tasks exceeds a specified value) additional controllable sections that would increase the processing quality are added to all tasks. Also, although with each of the above described embodiments description has been given of a structure where task processing quality is increased or decreased in a stepwise manner in response to presence or absence of a margin in the resource amount, change in processing quality of the present invention can also be executed for some tasks, and it is also possible to achieve the desired effect of the present invention with this type of structure.

Also, with each of the above described embodiments, since processing quality of all tasks is changed, there is the advantage that it is possible to permit large variation in required resource amount, but change of processing quality in the present invention can also be executed for some tasks, and it is also possible to achieve the desired effect of the present invention with this type of structure.

Also, a task receive program of the present invention can be configured as a program, in a multitask system for selectively executing any of a plurality of tasks, for causing the system to execute determination processing for determining executability of each task based on required resource amount for each task, and task selection processing for selecting a task constituting an execution object based on determination result of the determination means, further including required resource amount information acquisition processing for acquiring required resource amount information for secured sections and controllable sections specified in at least some tasks, wherein, in the determination processing, the determination is executed by virtually updating a processing level of at least some scheduled tasks within a range of the controllable sections, and in the task selection processing the selection is executed using the processing level determined as being executable. In a state where this program is stored in a known storage medium such as a CD-ROM, or can be installed by downloaded via a network, it is possible to achieve the desired effects of the present invention.

Fourth Embodiment

In each of the above described embodiments, a task management device of the present invention is achieved by endowing a multitask system with a task management function. In subsequent embodiments, the case will be described where a task management device of the present invention is achieved by endowing a multitask system with an operation determination function.

Figure 11:
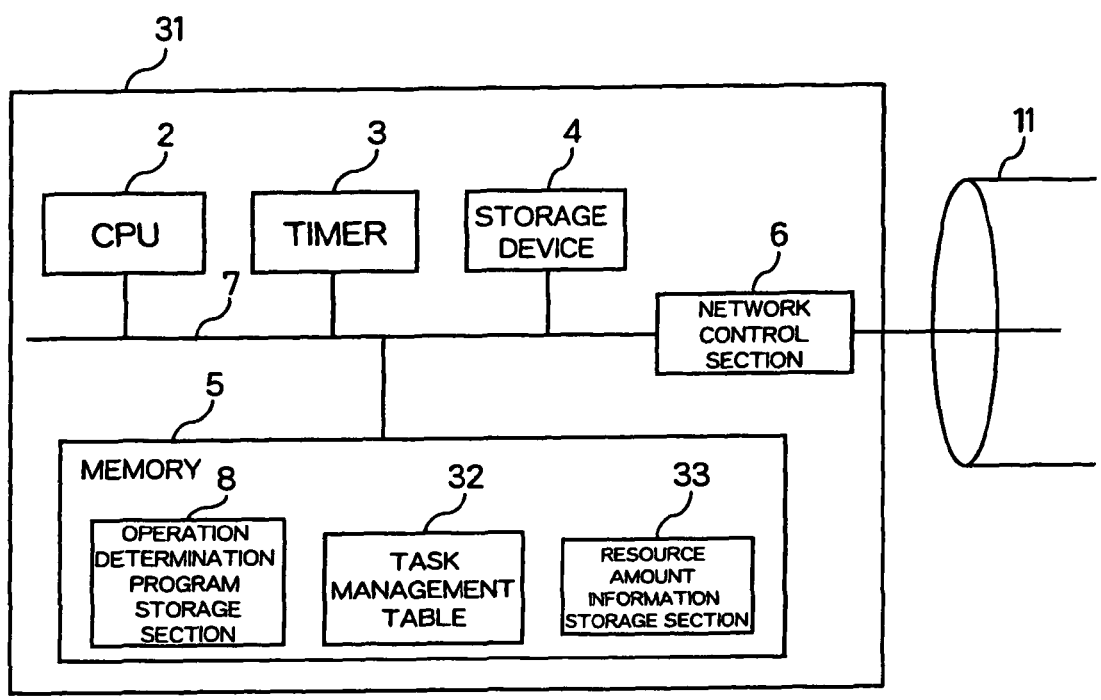
FIG. 11 is a block diagram of an operation determination device relating to a fourth embodiment of the present invention.

In FIG. 11, a multitask system 31 of an embodiment of the present invention comprises a CPU 2, a timer 3, a storage device 4, such as a hard disk etc., memory 5, a network 11, and a network controller 6 constituting an interface to the network 11. The CPU 2, timer 3, storage device 4, memory 5 and network controller 6 are connected by an internal bus 7.

The timer 3 is repeatedly clocked until a set specified time, and is capable of notifying the CPU 2 of the elapsing of a specified time, by interrupting the CPU 2 every set time. A determination object program etc. is stored in the storage device 4 as a task program, as well as the operation determination program of the present invention, and the memory 5 is read as required.

The memory 5 contains a task management table 32 for storing information for each task, in order to manage tasks that require delay securement.

Figure 12:
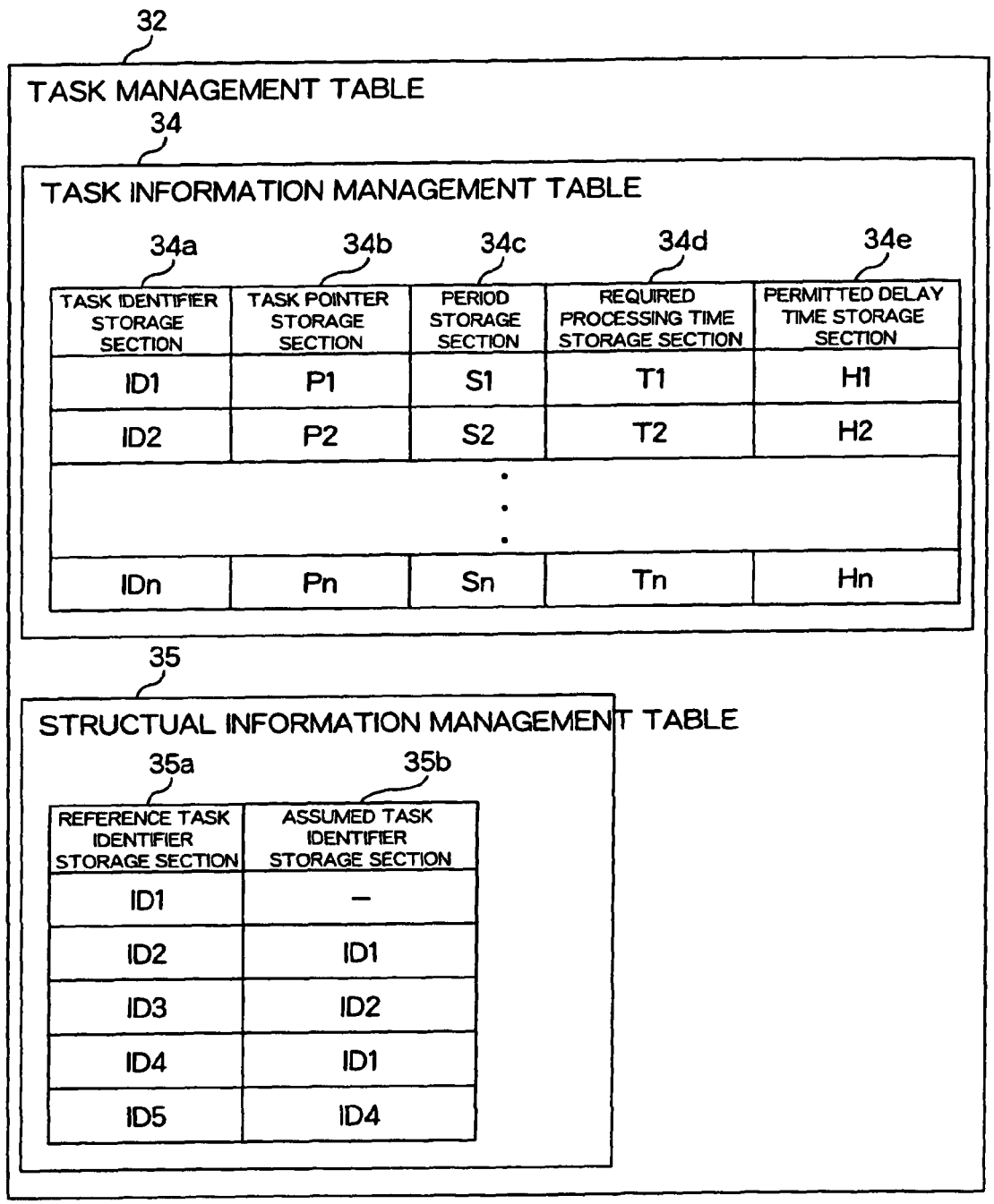
FIG. 12 is am explanatory drawing showing one example of a task management table.

FIG. 12 is a drawing showing one example of the task management table 32. The task management table 32 is made up of a task information management table 34 and a structural information management table 35.

The task information management table 34 is a table for managing information relating to tasks that require delay securement. The information stored in this task information management table 34 contains task identifier ID, task pointer P, periods, S, required processing time T and secure and deadline H respectively stored in a task identifier storage section 34a, a task pointer storage section 34b, a period storage section 34c, a required processing time storage section 34d, and a permitted delay time storage section 21f, and these items of information are respectively stored for each task. FIG. 12 shows information relating to one task on one horizontal row. The task identifier ID identifies each task, while the task pointer P indicates the position of each task program in the storage device 4 or memory 5. The period S is a time from the point in time where execution of each task starts to the point in time where the next execution starts, and if a particular task is executed, that task will not be permitted to newly execute during the set period S.

Required processing time T is processing time required in execution of each task, and constitutes a required resource amount of the present invention. The required processing time T is a sample value that is set in advance, which means that sometimes actual tasks may be completed before these values.

The deadline H is a permitted time such that if processing is completed within that time quality is satisfied, and is set to within the time represented by period S. In a state where an event has occurred for a particular task, if the elapsed time from the point in time where the previous execution commenced has exceeded the period S, or if task processing is interrupted, a delay arises in that task. The occurrence of this type of delay means that the permitted delay time H is used up. It is therefore necessary to complete task processing before this permitted delay time is used up completely.

Each of these items of information, period S, required processing time T, and deadline H are held in advance as data in an application program containing this task, stored in the storage device 4 as a result of installation by means of storage medium external to this application medium or a network 11 and transferred into the OS as a result of an operation determination request system call, that will be described later, and are stored in the task information management table 34 with a task identifier ID attached.

The structural information management table 35 contains structural information of the application, that is, information on the interrelationships of each task of that application. Specifically, the structural information management table 35 is provided with a base task identifier section 35a and a presumed task identifier section 35b, and respectively stores a task identifier ID for a particular task (hereafter called an arbitrary reference task) and a task identifier for a task (hereafter called an arbitrary presumed task) constituting the presume for execution.

Figure 13:
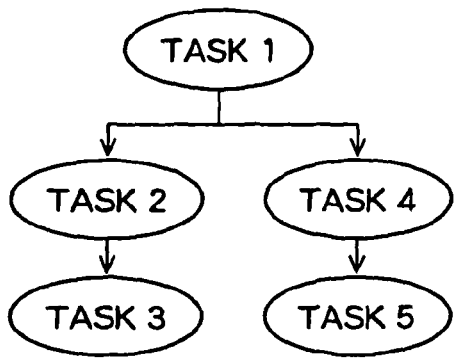
FIG. 13 is tree diagram showing one example of a task structure relating to the fourth embodiment.

For example, as shown in FIG. 13, an application constituting an object for operation determination is made up of tasks 1-5, and if it is presumed that execution of tasks 2 and 4 starts upon completion of execution of task 1, that execution of task 3 starts upon completion of execution of task 2, and execution of task 5 starts upon completion of execution of task 4, the content of the structural information management table 35 will be as shown in FIG. 12. By adding required processing time T for all presumed tasks together with required processing time T for all presumed tasks that have the presumed tasks as reference tasks using this structural information management table 35, it is possible to thoroughly extract all tasks that can be simultaneously executed. A resource amount information storage section is also provided in the memory 5 in order to manage resource amount information for the application usage environment. This resource amount information maintains the resource amount for the environment in which the application for operation determination is mounted as virtual information, and is stored in advance in the storage section 4 and read out from an appropriate memory 5.

When the application usage environment (hardware environment or software environment) already exists, resource amount information is obtained in advance from actual measurement of that usage environment. Also, if the usage environment does not exist, an original value provided from each hardware and software supplier of that usage environment are used as they are.

As resource amount of this embodiment, usage time of the CPU 2 in the usage environment is used. As the resource amount of the present invention it is also possible to selectively use all of usage time or storage capacity of devices other than the CPU, such as the storage device, the memory or a video memory, not shown, network communication speed, network server storage capacity, memory capacity, or hardware resources or software resources required in order to execute a specific task. It is also possible for the resource amount to differ according to type of task or function, for example, in the case where a task relates to data reading, the resource amount can be hard disk storage capacity, and usage time and capacity of the memory, while in the case where a task relates to signal processing the resource amount can be usage time of the CPU and usage time and storage capacity of the memory, and in the case where a task relates to image output the resource amount can be usage time of the CPU, usage time and storage capacity of the memory, and usage time and storage capacity of the video memory.

Figure 14:
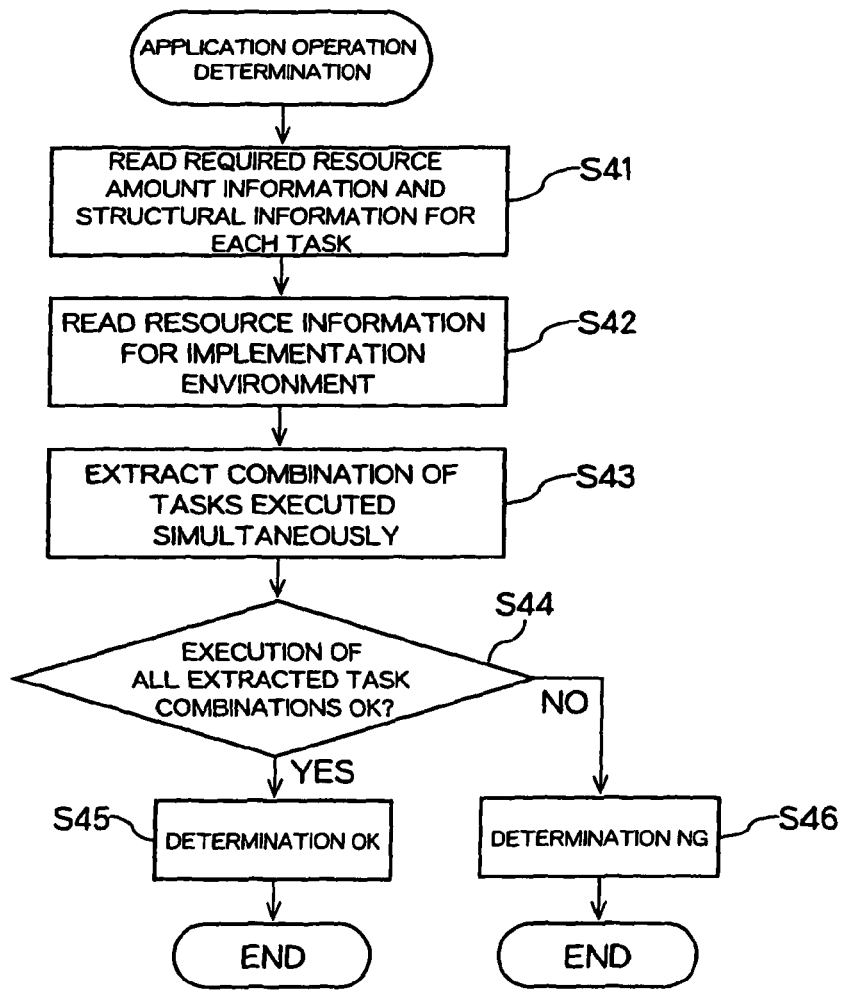
FIG. 14 is a block diagram showing operation determination processing relating to the fourth embodiment.

Operation determination processing of this embodiment will now be described with reference to FIG. 14. If an application operation determination request is input, the CPU 2 executes the following processing in accordance with an operation determination program stored in the operation determination program storage section 8.

First of all, required resource amount information (here it is required processing time T) and structural information for the application are respectively read from the task information management table 34 and the structural information management table 35 (S41). Resource environment information for the execution environment is also read from the resource information storage section (S42).

Next, structural information for the application that has been read in step S41 and an obtained task combination constituting a single function as a result of simultaneous execution based on required resource information for each task are extracted (S43). With the above described example of FIG. 13, task 2 and task 4, and task 3 and task 5, are extracted as a single function task as a result of simultaneous execution.

It is then determined whether or not all extracted combinations are executable by comparing the resource amount information read out in step S42 (S44). Specifically, for all extracted combinations, measurement of load in the implementation environment and QoS evaluation are carried out, and if the load is lower than a specified reference value and the QoS is above a specified reference value, it is determined that execution is possible, otherwise it is determined that execution is not possible.

The result of determination in step S44, when it is determined that execution is possible (S45) or when it is determined that execution is not possible (S46), is returned to the application and processing is terminated. Based on the output from S45 or S46, an appropriate text message is displayed in a display device (not shown) using specified display processing.

As described above, with the fourth embodiment, structural information of an application that is a determination object program, that is, information relating to association (execution order and execution timing) between tasks of the application, and required resource amount information for each task, is acquired, and based on this information the combinations of tasks which have a single function, being executable, are extracted by simultaneous execution. Executability of all extracted combinations (that is, executability for all functions possessed by the application) is then determined based on extracted combination and required resource amounts. Therefore, with this embodiment, since it is possible to determine executability without actually executing operations of an application, determination of executability can be speeded up.

Also, with this embodiment, since the application contains structural information and resource amount information required for execution of each task, it is possible to handle information for various tasks contained in an application being executed as a combination.

Fifth Embodiment

Next, a fifth embodiment will be described. With the above described fourth embodiment, if the result of processing of step S44 is that execution is not possible, there is output indicating this fact, but with the fifth embodiment, in the case where it is determined that execution is not possible, processing amount is corrected and the determination is carried out again. The hardware structure of the system of the fifth embodiment is the same as that of the above described fourth embodiment, and so description will be omitted.

With the fifth embodiment, a secure section and a controllable section are set in advance for each task. For example, in the case where a task is an audio playback program, the secure section is a processing section relating to decode processing, and the controllable section is a processing section relating to supplemental processing for achieving high quality sound.

Also, in the case where the task is an MPEG moving picture playback program, the secure section is a processing section corresponding to a frame rate of $\frac{1}{15}$th of a second between images, and the controllable section is a processing section corresponding to a frame rate of $\frac{1}{30}$th of a second between images. If a task is a still picture or moving picture playback program, it is possible to adjust resolution by making a processing section corresponding to the lowest resolution that the human eye can tolerate a secure section, and making a processing section corresponding to a resolution higher than a controllable section.

Also, if an application is a web browser, a secure section is a processing section corresponding to communication rate for a packet communication interval within a network timeout period, and a controllable section is a processing section corresponding to a communication rate for a higher communication rate, for example (packet size/throughput). With an application program of this embodiment, secure section program statements and controllable section program statements of each task are described separately from each other, and a specified secure object flag is attached to the secure section memory address as a secure object identifier. This secure object flag is used in extracting secure sections at the time of executing an application, with a changed setting when service quality setting at the time of execution is changed as a result of the processing of step S57, which will be described later.

Also, resource amounts for the secure sections of each task, that is, resource amounts to secure lower limit allocations, are measured using a time measurement function of a scheduler program of the hardware or software environment under which that application is executed, or on an emulator simulating this environment. Specifically, a resource amount to be secured at the lower limit is measured in advance by measuring the time each resource is used, in each assigned period, from the start of execution of object processing to completion. Also, the deadline of each task can be measured by shifting execution start timing of a process back, in each assigned period, and measuring a window period until quality is no longer satisfied. It is also possible to calculate resource amount for the controllable sections by subtracting a measurement value for a secure section from a value measured using the same scheduler function while executing processing using the highest processing quality for each task. These items of resource amount information can also be obtained by this kind of trialing and actually performing these measurements on the system, or directly using specification values obtained from an application program vendor.

Figure 15:
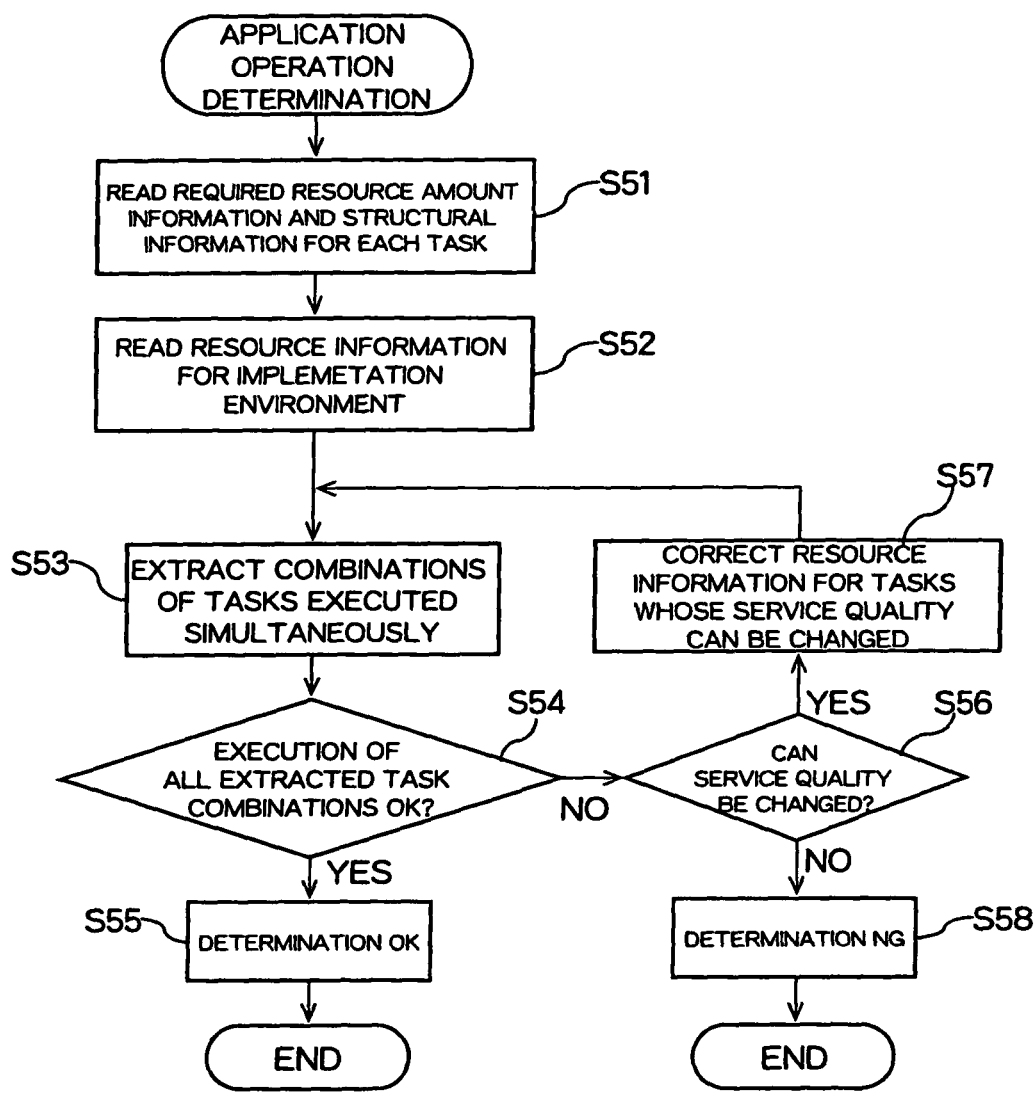
FIG. 15 is a block diagram showing operation determination processing relating to a fifth embodiment.

FIG. 15 shows operation determination processing relating to a fifth embodiment. In FIG. 15, processing from step S51 to S55 is the same as the processing from step S41 to S45 in the above-described fourth embodiment.

When there is a negative decision in step S54, specifically, when, for all extracted task combinations (that is, all combinations of tasks obtaining a single function by simultaneous execution), as a result of carrying out measurement of load in the implementation environment and QoS evaluation it is determined that a task exists that will cause load to be higher than a specified reference value or QoS to be lower than a specified reference value, then after that, for those type of task combinations, determination as to whether change in service quality is possible is carried out depending on whether or not there are controllable sections within the task combinations constituting determination objects.

When the result of this determination is that change of service quality is possible, that is, that there is a task containing controllable sections within a task combination constituting a determination object, resource information such that service quality change is possible is corrected and set again (S57). Specifically, for tasks containing controllable sections within task groups constituting determination objects, controllable sections are virtually excluded from the processing objects and this fact is indicated by, for example, storing a specified flag in a specified storage region of the memory 5.

Then, for setting having the controllable sections excluded from tasks containing controllable sections, executability of the task group is determined once again based on required resource amount after correction (S54), and if it is determined that execution is possible processing advances to step S55. When there are, for example, a plurality of tasks having controllable sections in step S57, the respective processing of steps S53, S54, S56 and S57 can be repeatedly executed a plurality of times by sequentially selecting some tasks constituting subjects of correction in a specified order of priority. If the determination in step S56 is negative, that is, when it is determined that a particular task group can not be executed and there is no scope for change in service quality (adjustment, deletion), this fact is returned to the application (S58), and processing is terminated. The point that an appropriate text message is displayed in a display device (not shown) using specified display processing based on the output from S55 or S56 is the same as the fourth embodiment described above.

As described above, with the fifth embodiment for some task groups made up of a plurality of tasks that have a possibility of being executed at the same time, if it is determined from looking at resource amount that can be provided by the system that execution is not possible, required resource amount for variable tasks is corrected (S57) and executability is determined based on the required resource amount after correction (S54). Therefore, even if it is determined once that execution is not possible, once it becomes determined, as a result of slightly changing service quality, that execution is possible, it is possible to reduce the number of processes for operation confirmation due to realization of that type of change.

With the above described fifth embodiment, the structure is such that processing amount is adjusted by virtually deleting the whole of controllable sections, but conversely it is also possible to have a structure such that when there is margin in the resource amount (specifically, when a difference between resource amount that can be provided and total required resource amount for all task combinations exceeds a specified value) additional controllable sections that would increase the processing quality are added to all tasks. Also, although with the above described fourth and fifth embodiments description has been given of a structure where task processing quality is increased or decreased in a stepwise manner in response to presence or absence of a margin in the resource amount, change in processing quality of the present invention can also be executed for some tasks, and it is also possible to achieve the desired effect of the present invention with this type of structure.

With the above described fourth and fifth embodiments, description has been given for an example of determining executability of a single application based on an interrelationship (structural information) between tasks of that application, but the present invention can also be applied to determination of executability when a plurality of applications are caused to run in parallel, or when middleware, being a determination object program, and an application running on the middleware are executed at the same time.

Specifically, in the event that executability is confirmed for a particular application (hereafter called a first application), if it is considered that execution takes place in parallel with an application besides the first application (hereafter called a second application) execution timing for respective tasks of the second application depends on the execution timing of some tasks of the first application, and if required resource amount for each task of the second application is known, it is possible to determine executability of that operation using the same processing as in the above described fourth embodiment, by adding respective items of information for execution timing and required resource amount for each task of this second application to the task management table 34 of the above described fourth embodiment and to the structural information management table, and storing them.

In this way, if executability in the case of causing a plurality of application to run in parallel in a specified multitask system is determined using the operation determination function of the present invention, it is possible to more faithfully reproduce external conditions at the time of execution of the first and second applications, and it is possible to carry out accurate operation determination. In this case, further, if required resource information and structural information for each task of the first application are provided in advance in the form of being stored in the storage device 4, it is possible to effectively use the operation determination function of the present invention even the case where an application vendor develops a second application adapted to this.

Also, with the above described fourth and fifth embodiments, resource amount information for a single type of implementation environment (hardware environment, software environment) is stored in the resource amount information storage section 33, but instead of this type of structure it is also possible to store resource amount information for a plurality of different types of implementation environment in the resource amount information storage section 33, and to sequentially trial operation determination processing for these plurality of types of resource amount information or make it a condition of executability determination that these plurality of types of resource amount information satisfy an AND condition. With this type of structure, it is possible to apply the present invention to cases such as where a transmitting and receiving side sharing a wide ranging hardware structure, such as a portable telephone having an application download function.

The operation determination function of the present invention can also be provided as a load measurement board or evaluation board for implementing some functions by connecting removably to a well known personal computer. That is, it is possible to provide respective items of information corresponding to a task management table 32 and a resource amount information storage section 33 and a processing program of the above described fourth and fifth embodiment, or a modified example, in the form of being stored in a well known single-chip microprocessor board having a CPU, ROM, RAM and input output interface connected by a bus line, making it is possible to achieve the desired effect of the present invention.

Also, an operation determination program of the present invention can be configured as a program for determining executability of a program containing a plurality of tasks in a system, for causing execution, on a computer, of structural information acquisition processing for acquiring information of tasks constituting a determination object program as structural information, function extraction processing for extracting a combination of the tasks which can be a single function by simultaneous execution based on the structural information, required resource amount information acquisition processing for acquiring information on resource amount required for execution of the respective tasks, and determination processing for determining executability with respect to all functions possessed by the object determination program based on the extracted task combinations and the required resource amount information, and in a state where this program is stored in a well known storage medium, such as CD-ROM, or handled by being downloaded via a network, it is possible to use as effective means for realizing the effects of the invention.

The invention claimed is:

1. A multitask system for selectively executing any of a plurality of tasks, the multitask system comprising:
   a processor; and
   a memory that stores a task management device, the task management device comprising:
   a determination unit that determines executability of each currently executing task and a new task based on required resource amount for each currently executing task and the new task,
   a task selection unit that selects the new task constituting an execution object based on a determination result of the determination unit, and
   a required resource amount information acquisition unit that acquires required resource amount information for secured sections and controllable sections specified in each currently executing task, the secured sections being separate from the controllable sections and each of the controllable sections having an order identifier to identify selection order among the controllable sections for adjusting the required resource amount for each currently executing task, wherein
   the determination unit executes the determination by virtually updating a processing level of the new task to be scheduled within a range of the controllable sections when a new request for scheduling is made, and repeating the determination of executability of each currently executing task by reducing the required resource amount by deleting processing objects from the controllable sections according to the order identifier such that the reducing allows for the new task to be scheduled,
   the new task includes more than one different task to be scheduled,
   the task selection unit executes the selection of the new task at the processing level determined as being executable, and
   each currently executing task and new task is performed by the processor.

2. The multitask system disclosed in claim 1, wherein the determination unit comprises
   a first determination unit that determines whether or not both secured sections and controllable sections of at least the new task are executable, and
   a second determination unit that, when it has been determined by the first determination means that execution is not possible, determines whether or not a secured section of the new task is executable, and wherein
   the task selection unit selects both secured sections and controllable sections for each new task that has been determined as executable by the first determination unit, and only selects secured sections of each new task determined as being executable by the second determination unit.

3. The multitask system of claim 1, wherein the determination unit virtually adjusts the processing level of all new tasks within a range of the controllable sections.

4. The multitask system of claim 1, wherein determination by the determination unit is executed when there is a request to change a number of tasks constituting processing objects.

5. The multitask system of claim 1, wherein determination by the determination unit is executed when there is a request to change parameters in at least some currently executing tasks.

6. The multitask system of claim 5, wherein the parameters are deadlines of at least some currently executing tasks.

7. The multitask system of claim 5, wherein the parameters are execution periods of at least some currently executing tasks.

8. The multitask system of claim 1, further comprising:
   a secure object identifier acquisition unit that acquires a secure object identifier for identifying secure sections and controllable sections of at least some new tasks, and wherein
   the task selection unit carries out the selection using the secure object identifier.

9. The multitask system of claim 1, further comprising
   an order identifier acquisition unit that acquires the order identifier, and wherein
   the determination unit selects controllable sections selected from among currently executing tasks constituting execution objects using the order identifier and according to that selection order, and also trials the selection and determination while changing an object of selection.

10. The multitask system of claim 1, further comprising
    a main/sub task identifier acquisition unit that obtains a main/sub task identifier for identifying a prescribed main task and sub tasks in which an execution condition is the execution of the main task, and wherein
    the determination unit and the task selection unit, using the main/sub task identifier, process the main task as the secure section, and process the sub task as the controllable section.

11. A task management method, in a multitask system for selectively executing at least some of a plurality of tasks, comprising:
    a determination step of determining executability of each currently executing task and a new task based on a required resource amount for each currently executing task and the new task,
    a task selection step of selecting the new task constituting an execution object based on determination result in the determination step, and
    a required resource amount information acquisition step of acquiring required resource amount information for secured sections and controllable sections specified in each currently executing task, the secured sections being separate from the controllable sections, and each of the controllable sections having an order identifier to identify selection order among the controllable sections for adjusting the required resource amount for each currently executing task, wherein
    in the determination step, the determination is executed by virtually updating a processing level of the new task, to be scheduled, within a range of the controllable sections when a new request for scheduling is made, and repeating the determination of executability of each currently executing task by reducing the required resource amount by deleting processing objects from the controllable sections according to the order identifier such that the reducing allows for new task to be scheduled, the new task including more than one different task to be scheduled, and in the task selection step the selection is executed at the processing level determined as being executable.

12. The task management method of claim 11, further comprising a secure object identifier acquisition step of acquiring a secure object identifier for identifying secure sections and controllable sections of at least some new tasks, and wherein in the task selection step the selection is carried out using the secure object identifier.

13. The task management method of claim 11, further comprising an order identifier acquisition step of acquiring the order identifier, and wherein, in the determination step, controllable sections selected from among new tasks constituting execution objects are selected using the order identifier and according to that selection order, and also the selection and determination are trialed while changing an object of selection.

14. The task management method of claim 11, further comprising a main/sub task identifier acquisition step of obtaining a main/sub task identifier for identifying a prescribed main task and sub tasks in which an execution condition is the execution of the main task, and wherein, in the determination step and the task selection step, using the main/sub task identifier, the main task is processed as the secure section, and the sub task is processed as the controllable section.

15. A non-transitory computer-readable storage medium having a computer-executable program embedded thereon, in a multitask system for selectively executing any of a plurality of tasks, the program, when executed by a computer, causing the system to execute:

determination processing for determining executability of each currently executing task and a new task based on required resource amount for each currently executing task and the new task, task selection processing for selecting the new task constituting an execution object based on determination result of a determination unit, and required resource amount information acquisition processing for acquiring required resource amount information for secured sections and controllable sections specified in each currently executing task, the secured sections being separate from the controllable sections and each of the controllable sections having an order identifier to identify selection order among the controllable sections for adjusting the required resource amount for each currently executing task, and wherein, in the determination processing, the determination is executed by virtually updating a processing level of the new task to be scheduled, within a range of the controllable sections when a new request for scheduling is made, and repeating the determination of executability of each currently executing task by reducing the required resource amount by deleting processing objects from the controllable sections according to the order identifier such that the reducing allows for the new task to be scheduled, the new task includes more than one different task to be scheduled, and in the task selection processing the selection of the new task is executed at the processing level determined as being executable.

16. The non-transitory computer-readable storage medium of claim 15, wherein the system is provided with a required resource amount information storage unit that stores required resource amount before and after change in processing level of at least some currently executing tasks.

17. The non-transitory computer-readable storage medium of claim 15, wherein the system uses a secure object identifier for identifying secure sections and controllable sections of at least some currently executing tasks.

18. The non-transitory computer-readable storage medium of claim 17, wherein the system uses the secure object identifier so as to cause a prescribed main task to be recognized by the system as a secure section, and cause a sub task constituting execution conditions of the main task to be recognized by the system as a controllable section.

19. The non-transitory computer-readable storage medium of claim 15, wherein the system uses a main/sub task identifier for identifying a prescribed main task and sub tasks in which an execution condition is the execution of the main task.

20. An operation determination device, for determining executability of a program containing a plurality of tasks in a system, comprising:

a processor, a structural information acquisition unit that acquires information of currently executing tasks and new tasks constituting a determination object program as structural information, a function extraction unit that extracts a combination of new tasks for simultaneous execution based on the structural information, a required resource amount information acquisition unit that acquires information on resource amount required for execution of the currently executing tasks and the combination of new tasks, wherein each task is performed by the processor, and the required resource amount for each task contains an uncontrollable and non-variable required resource amount which is separate from a controllable and variable required resource amount, the controllable and variable required resource amount having an order identifier to identify selection order among the controllable and variable required resource amount for each task, a determination unit that determines executability of the currently executing tasks with respect to all functions possessed by the object determination program based on the combination of new tasks, which has not been executed yet, and the required resource amount information when a new request for extracting is made, the extracted combination of new tasks including more than one different task, and a required resource amount correction unit that corrects the required resource amount for currently executing tasks, by adjusting the required resource amount for the currently executing tasks by repeating determination of executability while reducing the required resource amount by deleting processing objects from the controllable and variable required resource amount according to the order identifier such that the reducing allows for the combination of new tasks to be scheduled.

21. The operation determination device of claim 20, wherein the determination unit, when it is determined that execution is not possible, further determines executability for all functions possessed by the determination object program based on the combination of new tasks and the required resource amount after correction.

22. The operation determination device of claim 20, wherein the determination unit determines executability when a plurality of determination object programs are executed in parallel in the system.

23. An operation determination method for determining executability of a program containing a plurality of tasks in a system, comprising:
  a structural information acquisition step of acquiring information of currently executing tasks and new tasks constituting a determination object program as structural information,
  a function extraction step of extracting a combination of new tasks for simultaneous execution based on the structural information,
  a required resource amount information acquisition step of acquiring information on resource amount required for execution of the currently executing tasks and the combination of new tasks, wherein each task is performed by a processor, and the resource amount required for each task contains an uncontrollable and non-variable required resource amount which is separate from a controllable and variable required resource amount, the controllable and variable required resource amount having an order identifier to identify selection order among the controllable and variable required resource amount for each task,
  a determination step of determining executability of the currently executing tasks with respect to all functions possessed by the object determination program based on the combination of new tasks, which has not been executed yet, and the required resource amount information when a new request for extracting is made, and
  a required resource amount correction step of correcting the required resource amount for currently executing tasks by adjusting the required resource amount for the currently executing tasks by repeating determination of executability while reducing the required resource amount by deleting processing objects from the controllable and variable required resource amount according to the order identifier such that the reducing allows for the combination of new tasks to be scheduled, and
  the extracted combination of new tasks includes more than one different task.

24. The operation determination method of claim 23, wherein
  in the determination step, when it has been determined that execution is not possible executability is further determined for all functions possessed by the determination object program based on a combination of new tasks and the required resource amount after correction.

25. The operation determination method of claim 23, wherein, in the determination step, executability is determined when a plurality of determination object programs are executed in parallel in the system.

26. A non-transitory computer readable storage medium having an operation determination program embedded thereon, for determining executability of a program containing a plurality of tasks in a system, the operation determination program, when executed by a computer, causing the system to execute:
  structural information acquisition processing for acquiring information of currently executing tasks and new tasks constituting a determination object program as structural information,
  function extraction processing for extracting a combination of new tasks for simultaneous execution based on the structural information,
  required resource amount information acquisition processing for acquiring information on resource amount for secured sections and controllable sections required for execution of the currently executing tasks and the combination of new tasks, wherein the secured sections are separate from the controllable sections for each task, each of the controllable sections having an order identifier to identify selection order among the controllable sections for adjusting the required resource amount, and
  determination processing for determining executability of the currently executing tasks with respect to all functions possessed by the object determination program based on the combination of new tasks, which has not been executed yet, and the required resource amount information when a new request for extracting is made, by repeating determination of executability of each currently executing task by reducing the required resource amount by deleting processing objects from the controllable sections according to the order identifier such that the reducing allows for combination new task to be scheduled, wherein the combination of new tasks includes more than one different task.

27. The non-transitory computer readable storage medium of claim 26, wherein the system is provided with a structural information storage unit that stores structural information about the determination object program.

28. The non-transitory computer readable storage medium of claim 26, wherein the system is provided with a required resource information storage unit that stores information about resource amount required for execution of each function.

* * * * *